United States Patent [19]
Saito

[11] Patent Number: 5,491,387
[45] Date of Patent: Feb. 13, 1996

[54] DISCHARGE LAMP LIGHTING CIRCUIT FOR INCREASING ELECTRIC POWER FED IN INITIAL LIGHTING OF THE LAMP

[75] Inventor: Shigeru Saito, Omiya, Japan

[73] Assignee: Kansei Corporation, Saitama, Japan

[21] Appl. No.: 81,213

[22] Filed: Jun. 25, 1993

[30] Foreign Application Priority Data

| Jun. 29, 1992 | [JP] | Japan | 4-170886 |
| Sep. 25, 1992 | [JP] | Japan | 4-279218 |
| Sep. 25, 1992 | [JP] | Japan | 4-279220 |

[51] Int. Cl.$^6$ ............................................. H05B 41/36
[52] U.S. Cl. .................... 315/307; 315/308; 315/247; 315/DIG. 5; 315/287; 315/82; 315/DIG. 7
[58] Field of Search ........................... 315/307, 308, 315/287, 224, 360, 208, DIG. 7, 247, DIG. 5, DIG. 2, 82

[56] References Cited

U.S. PATENT DOCUMENTS

| 3,999,100 | 12/1976 | Dendy et al. | 315/308 |
| 4,240,009 | 12/1980 | Paul | 315/224 |
| 4,422,016 | 12/1983 | Kurple | 315/241 S |
| 4,791,338 | 12/1988 | Dean et al. | 315/174 |
| 5,103,143 | 4/1992 | Daub | 315/308 |
| 5,151,631 | 9/1992 | Oda et al. | 315/127 |
| 5,204,587 | 4/1993 | Mortimer et al. | 315/308 |
| 5,212,428 | 5/1993 | Sasaki et al. | 315/308 |

FOREIGN PATENT DOCUMENTS 0191482  11/1983  Japan ........................ 372/38

*Primary Examiner*—Robert J. Pascal
*Assistant Examiner*—Arnold Kinkead

[57] ABSTRACT

A discharge lamp lighting apparatus includes a voltage raising element for raising a DC input voltage, a pulse generator for varying the output voltage output by the voltage raising element is a pulse voltage having a given pulse width and outputting the pulse voltage, a bridge circuit for applying the pulse voltage to a discharge lamp, a voltage detecting element for detecting a voltage applied to the discharge lamp, a current detecting element for detecting a current running through the discharge lamp, an adder for adding a first amplification signal output by a first amplifier and a second amplification signal output by a second amplifier together, elements for delaying outputs from the amplifiers, and a pulse width modulator for controlling the pulse width of the pulse voltage.

6 Claims, 28 Drawing Sheets

5,491,387

DISCHARGE LAMP LIGHTING CIRCUIT FOR INCREASING ELECTRIC POWER FED IN INITIAL LIGHTING OF THE LAMP

BACKGROUND OF THE INVENTION

1. Field of the Invention

This invention relates to a discharge lamp lighting apparatus used for vehicles.

2. Description of the Prior Art

Heretofore, a lighting apparatus such as that shown in FIG. 34 is known (see Japanese Patent Application Early Laid-open Publication No. Hei 3-8299).

Referring to FIG. 34, the numeral 1 denotes a DC voltage raising circuit for raising the DC voltage of a battery 2, the numeral 3 denotes an HF (high frequency) voltage raising circuit for converting the output voltage of the DC voltage raising circuit 1 into a sinusoidal AC voltage, the numeral 4 denotes an ignitor circuit for applying a high voltage to a discharge lamp 5, the numeral 6 denotes an ignitor starting circuit for outputting a starting signal to the ignitor circuit 4, and the numeral 7 denotes a control circuit for controlling the output voltage of the DC voltage raising circuit 1.

The control circuit 7 is made up of a voltage calculating portion 7a for detecting the output voltage of the DC voltage raising circuit 1, a current calculating portion 7b for detecting the output current of the DC voltage raising circuit 1, and a pulse duration modulating portion 7c. The pulse duration modulating portion 7c serves to generate a rectangular pulse having a duty cycle corresponding to each of signals output by the voltage calculating portion 7a and the current calculating portion 7b. The numeral 8 denotes a connector.

When a lighting switch S is turned on, a high voltage trigger is generated in the ignitor circuit 4 by means of the ignitor starting circuit 6. This high voltage trigger causes the discharge lamp 5 to be lighted, and then the output voltage of the DC voltage raising circuit 1 is controlled at any time by the control circuit 7. This leads to a stationary state of the discharge lamp 5.

However, since the conventional discharge lamp lighting apparatus has no feedback control means for suitably setting electric power to be supplied to a load (i.e., the discharge lamp 5), it takes much time to cause the discharge lamp 5 to reach a normal discharging state after turning on the switch S. That is, the conventional apparatus has a fault in that a rise time is long.

Further, the conventional apparatus has a fault as is clear from the following. When the discharge lamp 5 is lighted, a timer (not shown) is actuated. After the lapse of a predetermined time, the timer stops the ignitor starting circuit 6. This arrangement prevents the high voltage trigger from applying a voltage to the lamp 5 or connector 8 for more than a given time. Therefore, if the connection of the connector 8 is temporarily cut by, e.g., vibrations, the discharge of the lamp 5 is attenuated and accordingly the lamp 5 will not be again lighted by the voltage output by the HF voltage raising circuit 3. Therefore, the lamp 5 is extinguished temporarily or completely.

Further, the conventional apparatus has another fault as is clear from the following. The HF voltage raising circuit 3 unconditionally outputs an AC voltage as a lamp voltage regardless of a drop of the source voltage of the apparatus. Therefore, for example, if the HF voltage raising circuit 3 outputs the AC voltage by the switching of four transistors when the output voltage of the DC voltage raising circuit 1 drops and then the lamp voltage drops to a discharge maintaining voltage, the lamp 5 is easily extinguished owing to a transient voltage drop caused in the switching.

SUMMARY OF THE INVENTION

It is an object of the invention to provide a discharge lamp lighting apparatus capable of shortening a rise time for lighting a discharge lamp, and emitting a flat light.

It is another object of the invention to provide a discharge lamp lighting apparatus capable of avoiding the instantaneous or lasting extinction of the discharge lamp even if the contact of connectors are instantaneously severed.

It is still another object of the invention to provide a discharge lamp lighting apparatus capable of keeping the discharge lamp emitting a light even if the voltage of a power source drops.

The discharge lamp lighting apparatus according to the invention is characterized by:

means for detecting a voltage applied to a discharge lamp;

means for detecting a current passing through the lamp;

means for multiplying a signal detected by the voltage detecting means and a signal detected by the current detecting means together;

means for outputting a comparison signal obtained by comparing a multiplication value output by the multiplying means with a predetermined reference value; and means for controlling the pulse width of a pulse voltage so that the comparison signal has a given value.

Further, the discharge lamp lighting apparatus according to the invention is characterized by:

means for detecting an instantaneous state of feeding no electricity to the discharge lamp; and means for actuating an ignitor starting means when the state detecting means detects an instantaneous state of feeding no electricity to the discharge lamp.

Further, the discharge lamp lighting apparatus according to the invention is characterized by:

low-voltage detecting means for detecting an instantaneous voltage drop of a DC source; and means for fixing an on-off state of transistors and applying a DC voltage to the discharge lamp when the low-voltage detecting means detects an instantaneous voltage drop of the DC source.

DETAILED DESCRIPTION OF THE EMBODIMENTS

The embodiments of a discharge lamp lighting apparatus according to the invention will now be described hereinafter with reference to the appended drawings.

(Embodiment 1)

Figure 1:
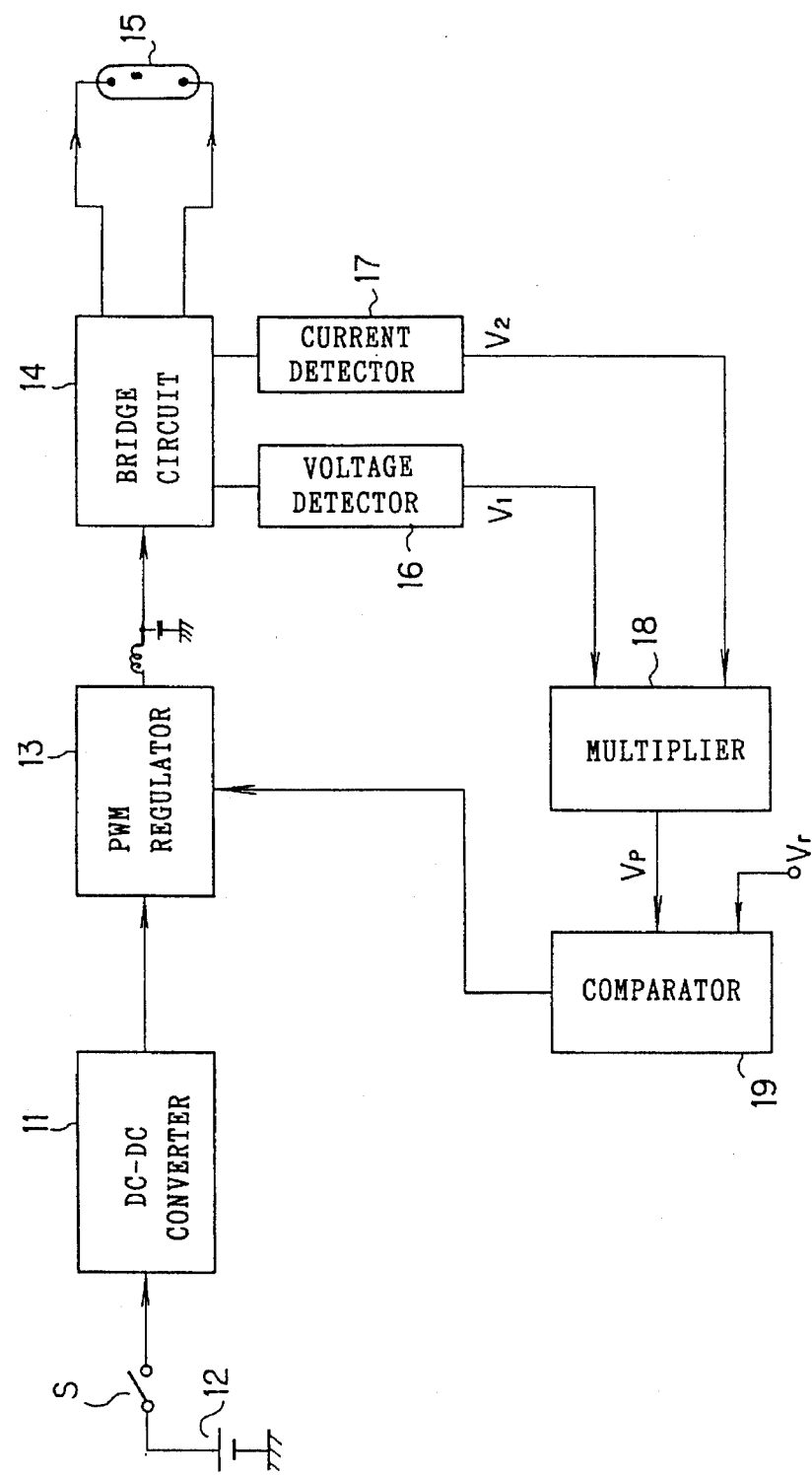
FIG. 1 is a block diagram showing a construction of a discharge lamp lighting apparatus according to a first embodiment of the invention.

Referring first to FIG. 1, the numeral 11 denotes a DC converter for raising a DC voltage of a battery 12, the numeral 13 denotes a PWM regulator (Pulse Width Modulation regulator) for generating a pulse voltage from a raised DC voltage, and the numeral 14 denotes a bridge circuit for converting the pulse voltage into an AC voltage having a rectangular waveform and then applying the AC voltage to a high-brightness discharge lamp 15.

The numeral 16 denotes a voltage detecting circuit (voltage detecting means) for detecting a voltage applied to the lamp 15, the numeral 17 denotes a current detecting circuit (current detecting means) for detecting a current passing through the lamp 15, the numeral 18 denotes a multiplier for multiply the value of a signal output by the voltage detecting circuit 16 by the value of a signal output by the current detecting circuit 17, and the numeral 19 denotes a comparator for comparing a multiplication signal output by the multiplier 18 with a predetermined reference value Vr (a value corresponding to the specified electric power Er of the lamp 15) to output a comparison signal.

The PWM regulator 13 serves to modulate the pulse width of a pulse voltage so that the comparison signal output by the comparator 19 becomes zero. The PWM regulator 13 functions as a means for generating a pulse voltage of a given pulse width and as a means for modulating the pulse width of the pulse voltage.

Actions in the embodiment will now be described hereinafter.

When a lighting switch S is turned on, the DC voltage of the battery 12 is raised by the DC converter 11. The PWM regulator 13 varies the raised DC voltage to a pulse voltage having a given pulse width and outputs the pulse voltage. On the other hand, the initial lighting of the lamp 15 is made by a high-voltage trigger circuit (not shown), and then the bridge circuit 14 varies the pulse voltage to an AC voltage having a rectangular waveform and applies the AC voltage to the lamp 15.

The voltage detecting circuit 16 outputs a voltage signal corresponding to the AC voltage applied to the lamp 15, while the current detecting circuit 17 outputs a current signal corresponding to the current passing through the lamp 15. Let it be supposed that the voltage V1 of the voltage signal output by the voltage detecting circuit 16 is $\beta Vb$ and the voltage V2 of the current signal output by the current detecting circuit 17 is $\alpha I$ where Vb is the voltage applied to the lamp 15 and I is the current passing through the lamp 15.

The multiplier 18 outputs a multiplication signal of the product of V1 and V2. The voltage Vp of the multiplication signal has the following relation.

$$Vp = V1 \times V2 = \alpha\beta Vb \times I$$

The comparator 19 outputs a comparison signal of the comparison of the reference value Vr with the voltage Vp. If Vp is larger than Vr, the pulse width of the PWM regulator 13 is made narrow to lessen the electric power fed to the lamp 15. If Vb is less than Vr, the pulse width of the PWM regulator 13 is made wide to increase the electric power supplied to the lamp 15. As a result, Vb becomes equal to Vr, so that the pulse width is balanced.

Since a feedback loop in which Vr is a reference value is formed here, the rated power of the lamp 15 is always fed to the lamp 15 if Vr is set at the value of the rated power of the lamp 15.

By the way, in the initial lighting of the lamp 15, the terminal voltage of the lamp 15 is about 25 volts because the lamp 15 is filled with xenon which is a discharge gaseous component. The terminal voltage is considerably less than the rated voltage (85 volts) and therefore the electric power fed to the lamp 15 is conventionally small. However, since the lamp 15 is arranged to be fed with the rated power via the feedback loop, such as the multiplier 18, even in the initial lighting, a time required to feed the lamp 15 with the rated power or a rise time is relatively short after the lighting switch S is turned on.

(Embodiment 2)

Figure 2:
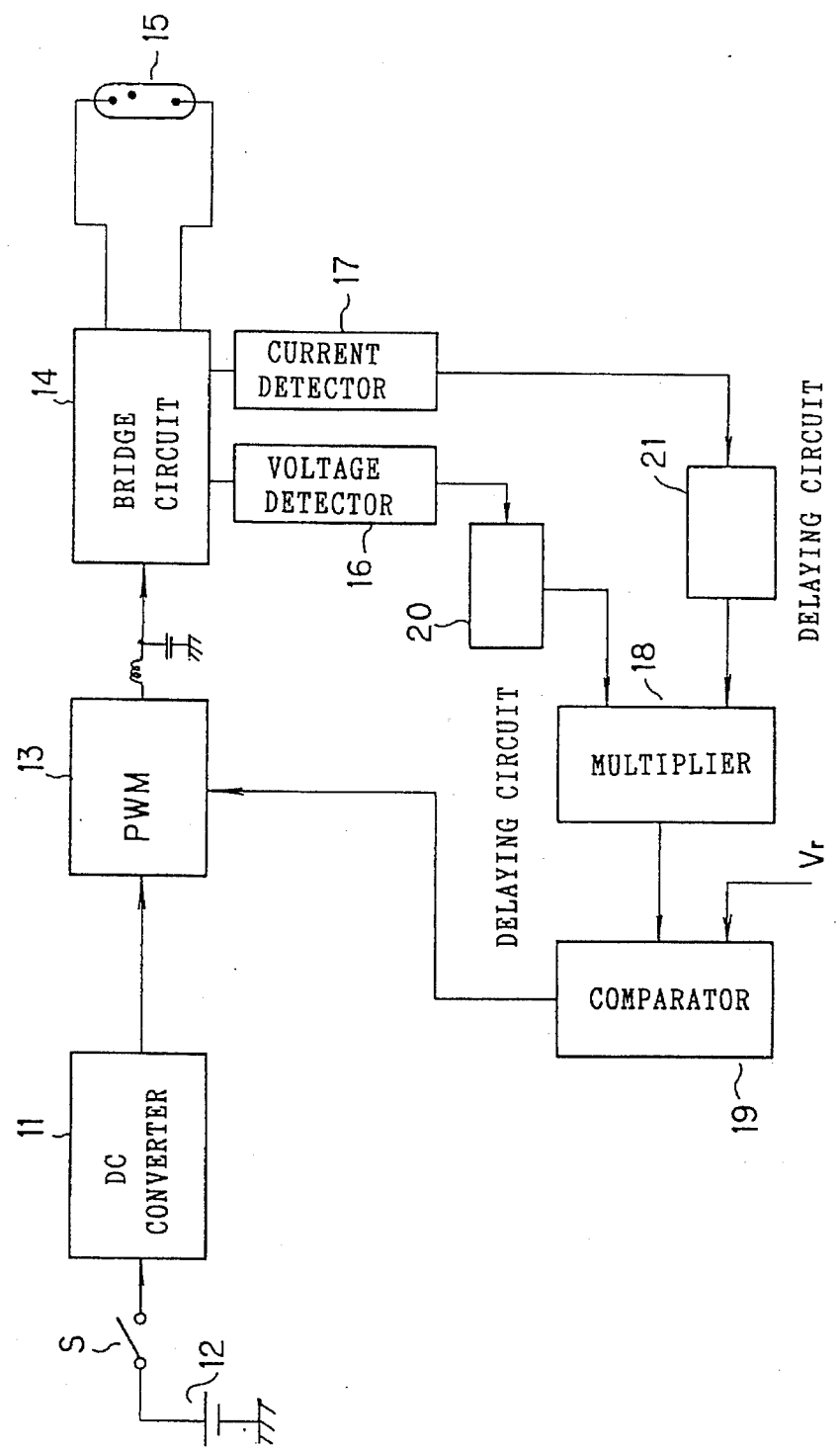
FIG. 2 is a block diagram showing a construction of a discharge lamp lighting apparatus according to a second embodiment of the invention.
Figure 3:
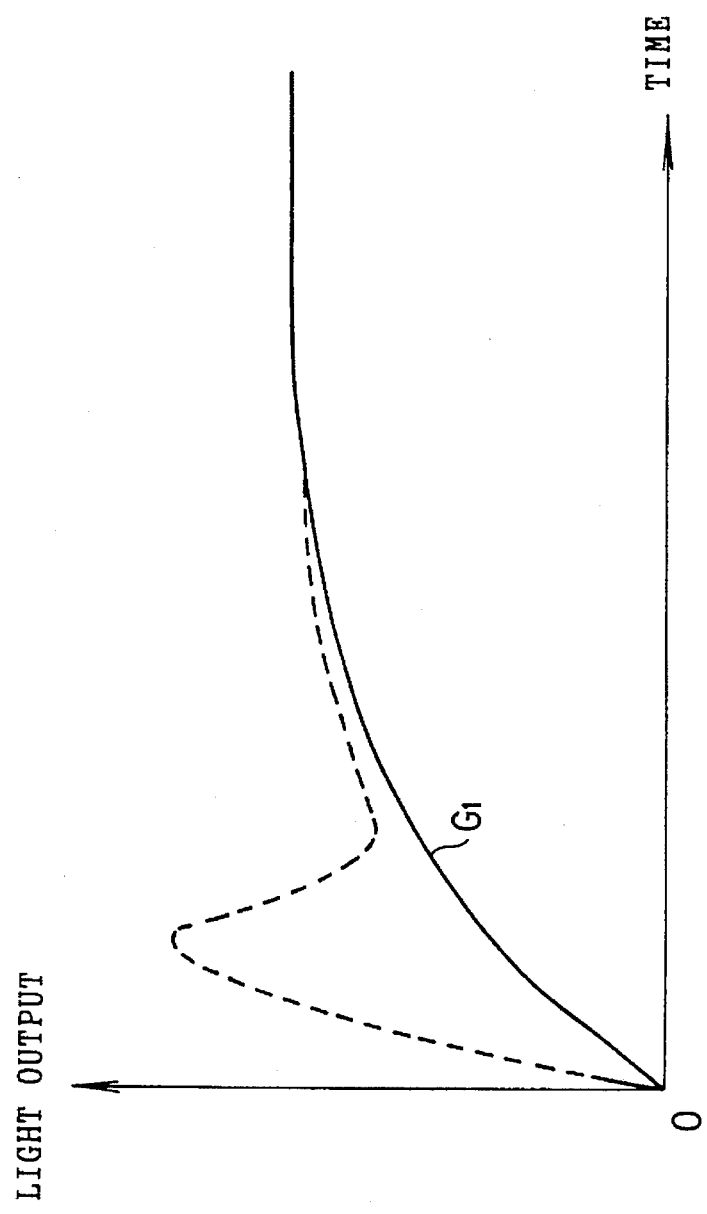
FIG. 3 is a starting characteristic of a discharge lamp according to the invention.

FIG. 2 shows a discharge lamp lighting apparatus in which delaying circuits 20, 21 are disposed between the multiplier 18 and the voltage detecting circuit 16 and between the multiplier 18 and the current detecting circuit 17, respectively. The speed of response of respective detection signals is delayed by the delaying circuits 20, 21 and accordingly a feedback signal for performing constant-power control is delayed. Therefore, the electric power fed to the lamp 15 in the initial lighting is increased, so that the amount of light emitted from the lamp 15 is abruptly increased as shown by the stitch line in FIG. 3. The rise time becomes still shorter. The solid line G1 shows the relationship between the amount of light emitted therefrom and a time in a case where the apparatus is not provided with the delaying circuits 20, 21.

(Embodiment 3)

Figure 4:
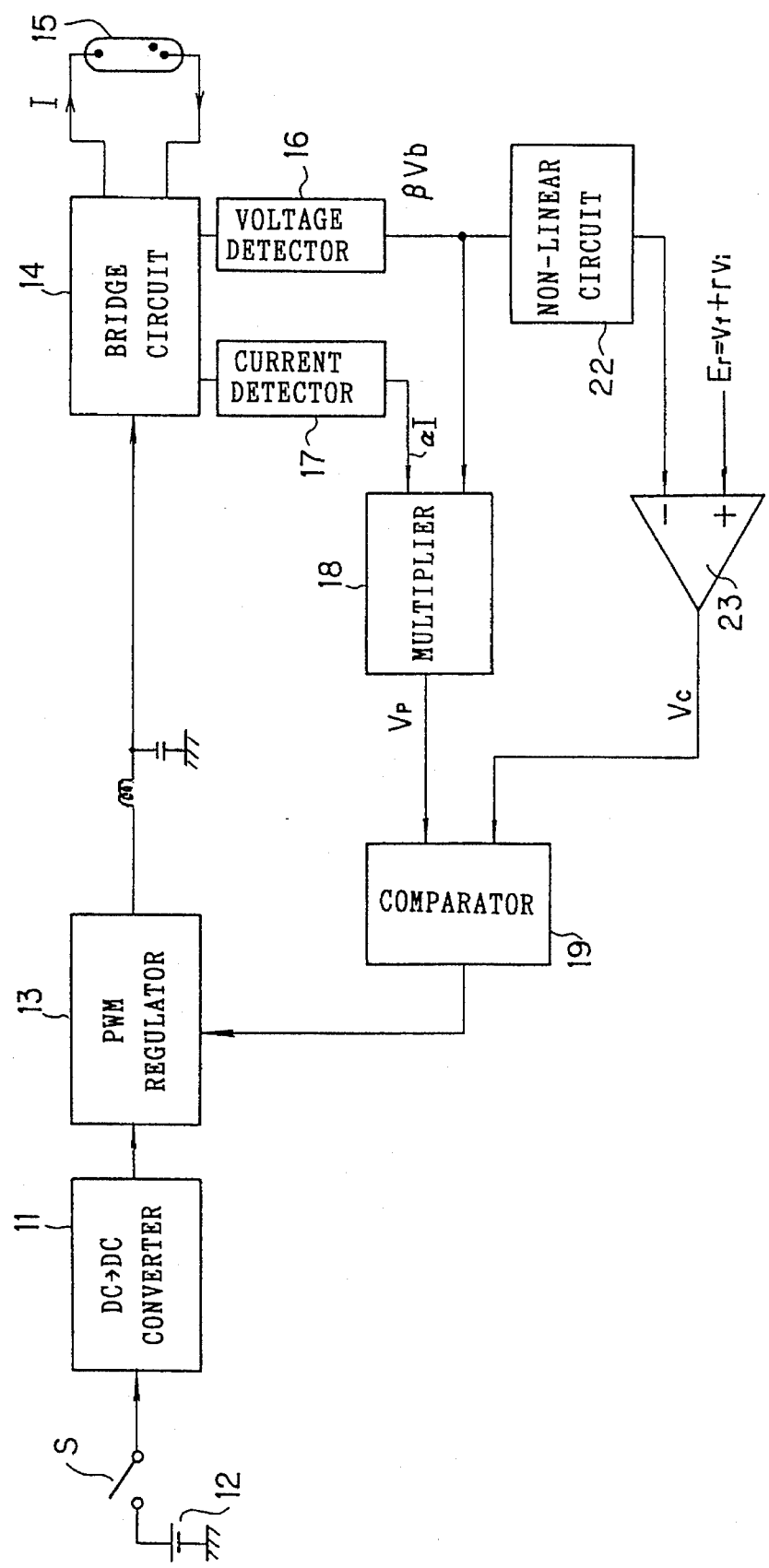
FIG. 4 is a block diagram showing a construction of a discharge lamp lighting apparatus according to a third embodiment of the invention.

Referring to FIG. 4, the numerals 22 and 23 denote a nonlinear circuit and a differential amplifier, respectively. The nonlinear circuit and the differential amplifier serve to vary a reference voltage Vc of the comparator 19 in accordance with a voltage applied to the lamp 15. That is, if the voltage applied to the lamp 15 is low, the reference voltage Vc is caused to be raised.

The reference voltage Vc output by the differential amplifier 23 is expressed as follows:

$$Vc = Vr + \beta Vi - (\beta Vb)^n \tag{1}$$

where $\beta Vb$ is an output voltage of the voltage detecting circuit 16, $(\beta Vb)^n$ is a voltage obtained by non-linearly processing the output voltage $\beta Vb$, $Vr + \beta Vi$ is a reference voltage Er of the differential amplifier 23, Vi is a voltage for stop feeding excessive electric power, and $\beta$ and n are optional real numbers.

Figure 5:
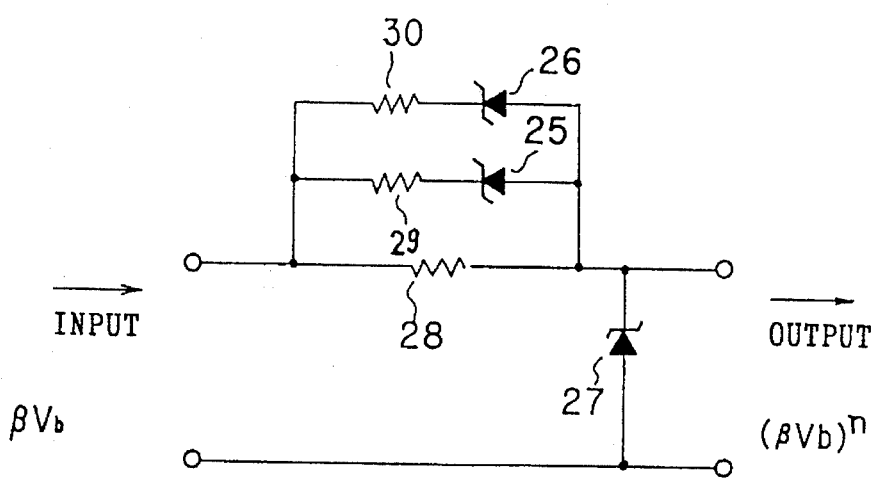
FIG. 5 is a circuit diagram showing a construction of a non-linear circuit.
Figure 6:
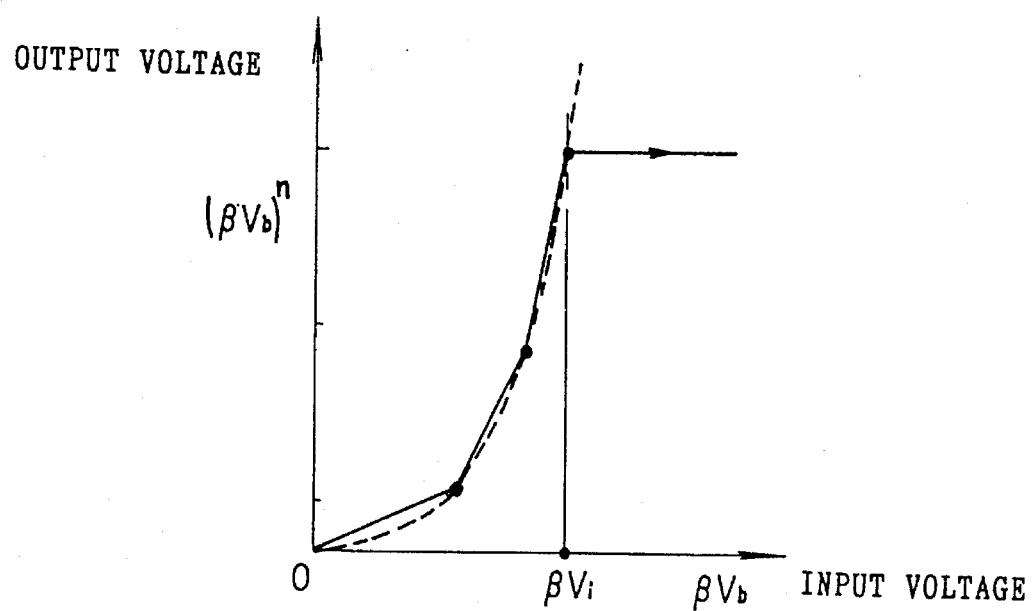
FIG. 6 is a graph showing a transfer characteristic of the non-linear circuit.
Figure 7:
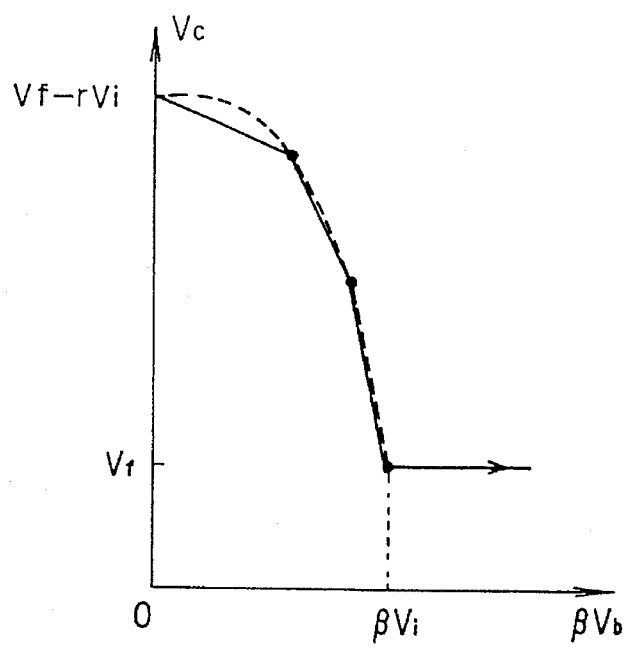
FIG. 7 is a graph showing a characteristic of a differential amplifier.
Figure 8:
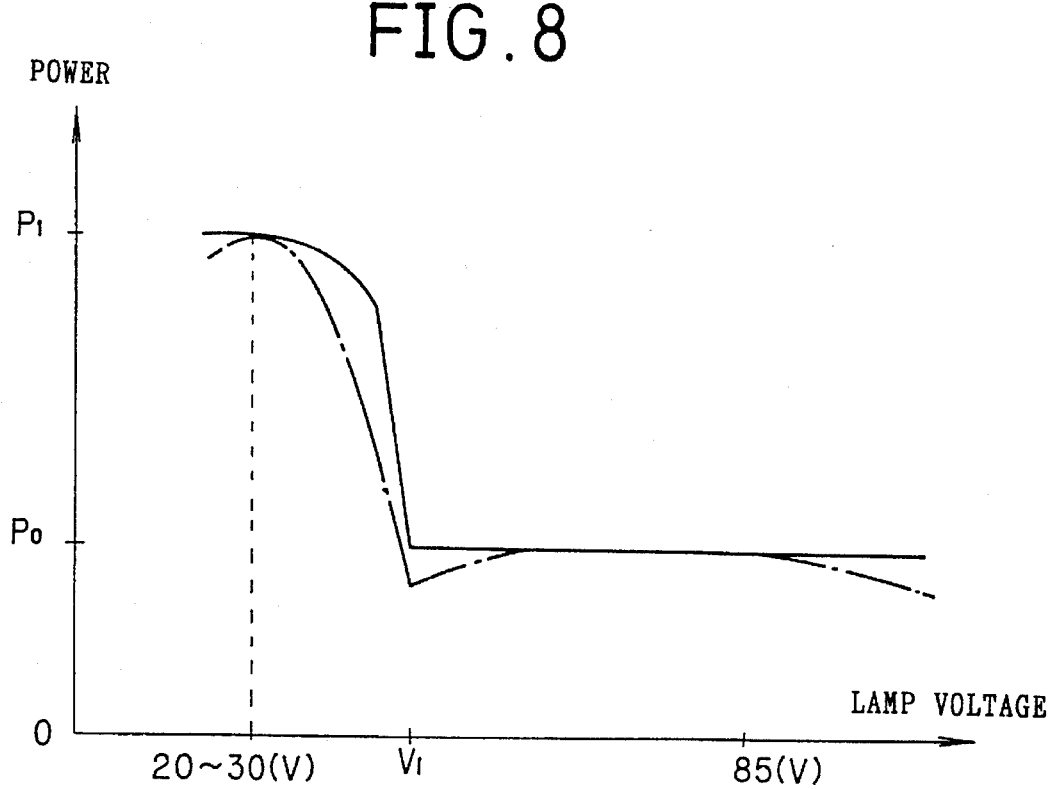
FIG. 8 is a graph showing a response characteristic.

As shown in FIG. 5, the non-linear circuit 22 includes three Zener diodes 25, 26, and 27 and three resistances 28, 29, and 30. On the supposition that the non-linear circuit 22 has an amplification characteristic with such a saturation characteristic as shown in FIG. 6, the output voltage Vc of the differential amplifier 23 expressed in the equation (1) abruptly drops near at Point 0 in FIG. 7 according to the rise of the input voltage of the non-linear circuit 22 (the output voltage of the voltage detecting circuit 16). Then the voltage Vc sustains a constant value after the voltage $\beta Vi$ as shown in FIG. 7. Therefore, the difference between the voltage Vc input to the comparator 19 and the voltage Vp output by the multiplier 18 is wide when the value of $\beta Vb$ is about zero (i.e., at the beginning of lighting of the lamp 15). Therefore, the PWM regulator 13 feeds more electric power than the rated power and indicates such a response characteristic as shown in FIG. 8. In other words, since the lamp 15 can be fed with two or three times as much electric power as the rated power P0 at the beginning, it is possible to shorten the rise time extremely. Further, since the electric power of the lamp 15 is constant after the voltage $\beta Vb$ surpasses the voltage $\beta Vi$, the uniformity of the intensity of light emitted from the lamp 15 is attainable.

The alternate long and short dash line shown in FIG. 8 indicates the characteristic of a circuit shown in FIG. 21 which will be described hereinafter.

(Embodiment 4)

Figure 9:
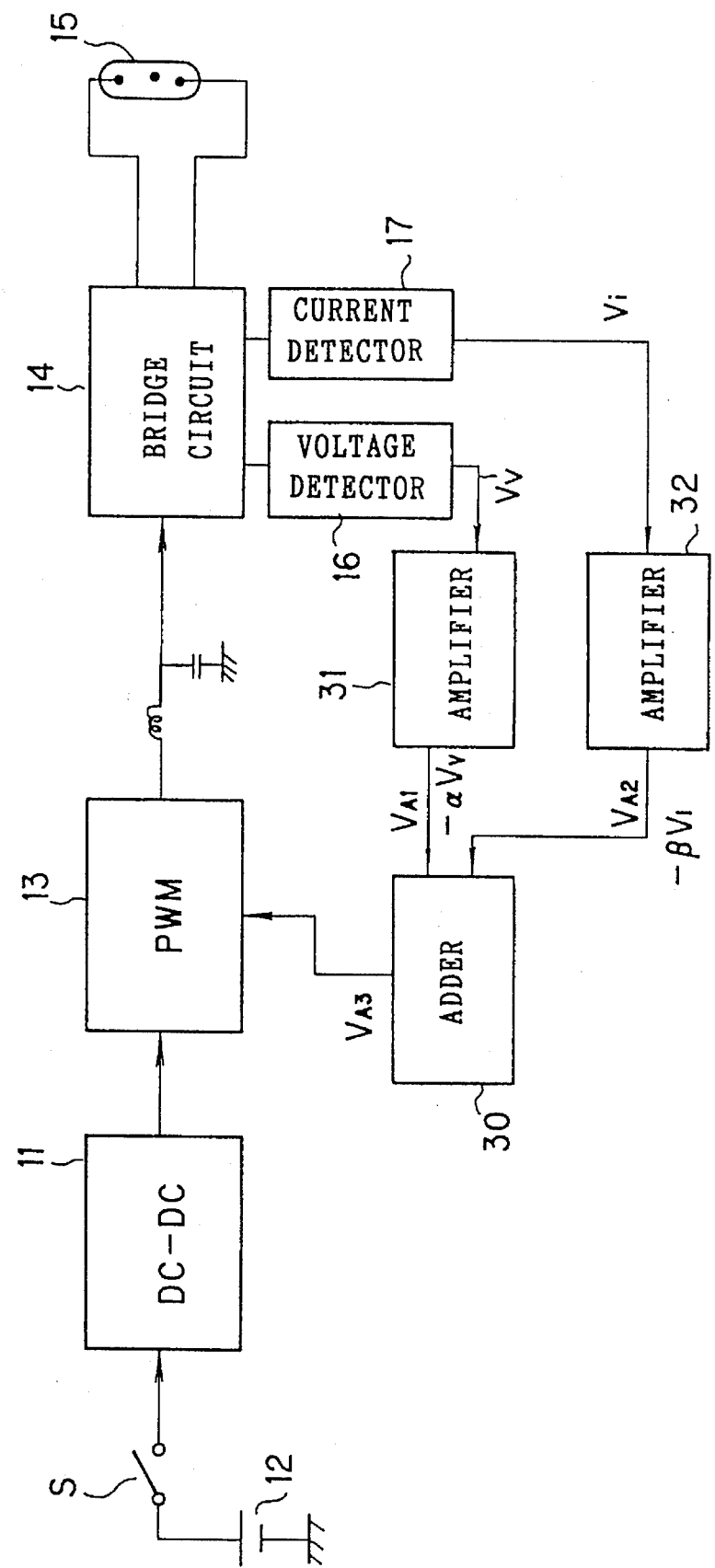
FIG. 9 is a block diagram showing a construction of a discharge lamp lighting apparatus according to a fourth embodiment of the invention.

FIG. 9 shows a discharge lamp lighting apparatus in which a voltage detection signal output by the voltage detecting circuit 16 and a current detection signal output by the current detecting circuit 17 are added up by an adder 30 and then the pulse width of a pulse voltage output by the PWM regulator 13 is modulated so that its resultant addition signal has a given value. That is, the apparatus is designed so that the electric power to be fed to the lamp 15 is constant even in at the beginning of lighting of the lamp 15. The numerals 31 and 32 denote amplifiers (first and second amplifying means, respectively).

If the voltage VA1 output by the amplifier 31 is $-\alpha Vv$ and the voltage VA2 output by the amplifier 32 is $-\beta Vi$, the voltage VA3 output by the adder 30 is expressed as follows:

$$VA3 = \alpha Vv + \beta Vi$$

where Vv is the voltage of a detection signal output by the voltage detecting circuit 16, Vi is the voltage of a detection signal output by the current detecting circuit 17, and $\alpha$ and $\beta$ are amplification degrees of the amplifiers 31 and 32, respectively.

The PWM regulator 13 controls an "on" duration, which is the pulse width of the pulse voltage, to cause the sum total of a detection signal detected by the voltage detecting circuit 16 and a detection signal detected by the current detecting circuit 17 to be constant, or to obtain the following relation:

$$Er = VA3 = \alpha Vv + \beta Vi \tag{A}$$

Let it be supposed that the current passing through the lamp 15 is set to be the rated current It so that Vt is equal to $\alpha Vv$ when the voltage applied to the lamp 15 is the rated voltage Vt and that there is the following relationship between them:

$$\alpha Vv = \beta Vi = \tfrac{1}{2} Er \tag{B}$$

where Vi is the voltage of a detection signal detected by the current detecting circuit 17 when the current passing through the lamp 15 is It. If so, the electric power Pt fed to the lamp 15 is $$Pt = Vt \cdot It = \alpha Vv \times \beta Vi$$

This means that the outputs of the amplifiers 31, 32 are equal to each other and are each Er/2.

If the voltage V of the lamp 15 is dislocated from the rated voltage Vt by $\pm X\%$, the voltage Vi is also varied to Vi'. Therefore, the following equations are obtained according to (A) and (B).

$$Er = \alpha Vt(1 \pm X/100) + \beta Vi' \quad \text{(C)}$$

$$\begin{aligned} \beta Vi' &= Er - \alpha Vt(1 \pm X/100) \\ &= Er\{1 - 1/2(1 \pm X/100)\} \\ &= \beta Vi(1 \mp X/100) \end{aligned} \quad \text{(D)}$$

The equations (C) and (D) mean that the lamp current rises as the lamp voltage drops or conversely the lamp current drops as the lamp voltage rises.

The electric power Px in this case is expressed as follows:

$$\begin{aligned} Px &= Vt(1 \pm X/100)It(1 \mp X/100) \\ &= VtIt(1 - (X/100)^2) \\ &= Pt(1 - (X/100)^2) \\ &= \{Er^2(1 - (X/100)^2)/4\}\alpha\beta \end{aligned}$$

Figure 10:
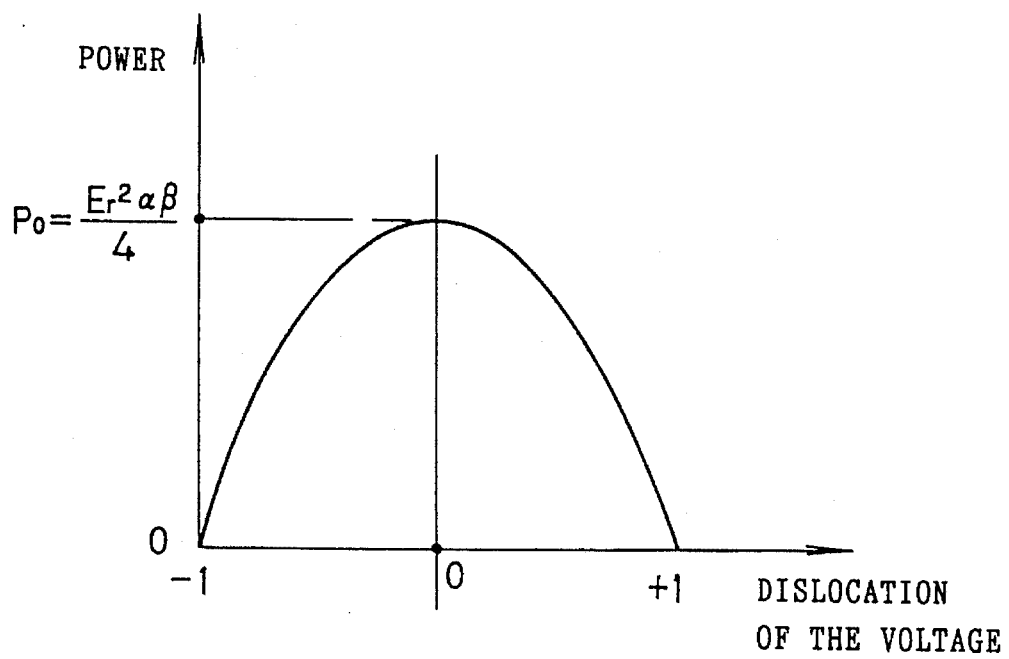
FIG. 10 is a graph showing the relationship between a discrepancy of a lamp voltage and electric power.

As shown in FIG. 10, the electric power Px is almost constant in the neighborhood of the vertex of the graph or in the neighborhood of the rated voltage of the lamp 15. For example, when the voltage Vt is varied by 20%, the electric power Px drops only by 4% according to the relation $1-(X/100)^2=1-(0.2)^2=0.96$. This indicates an appreciated improvement. In the case of constant-current driving, the rate of variation of the power Px is ±20%.

Further, since the lamp voltage is low at the beginning and the lamp current can pass through twice as much as the rated current, the rise time is shorter than that in the constant-current driving.

Figure 11:
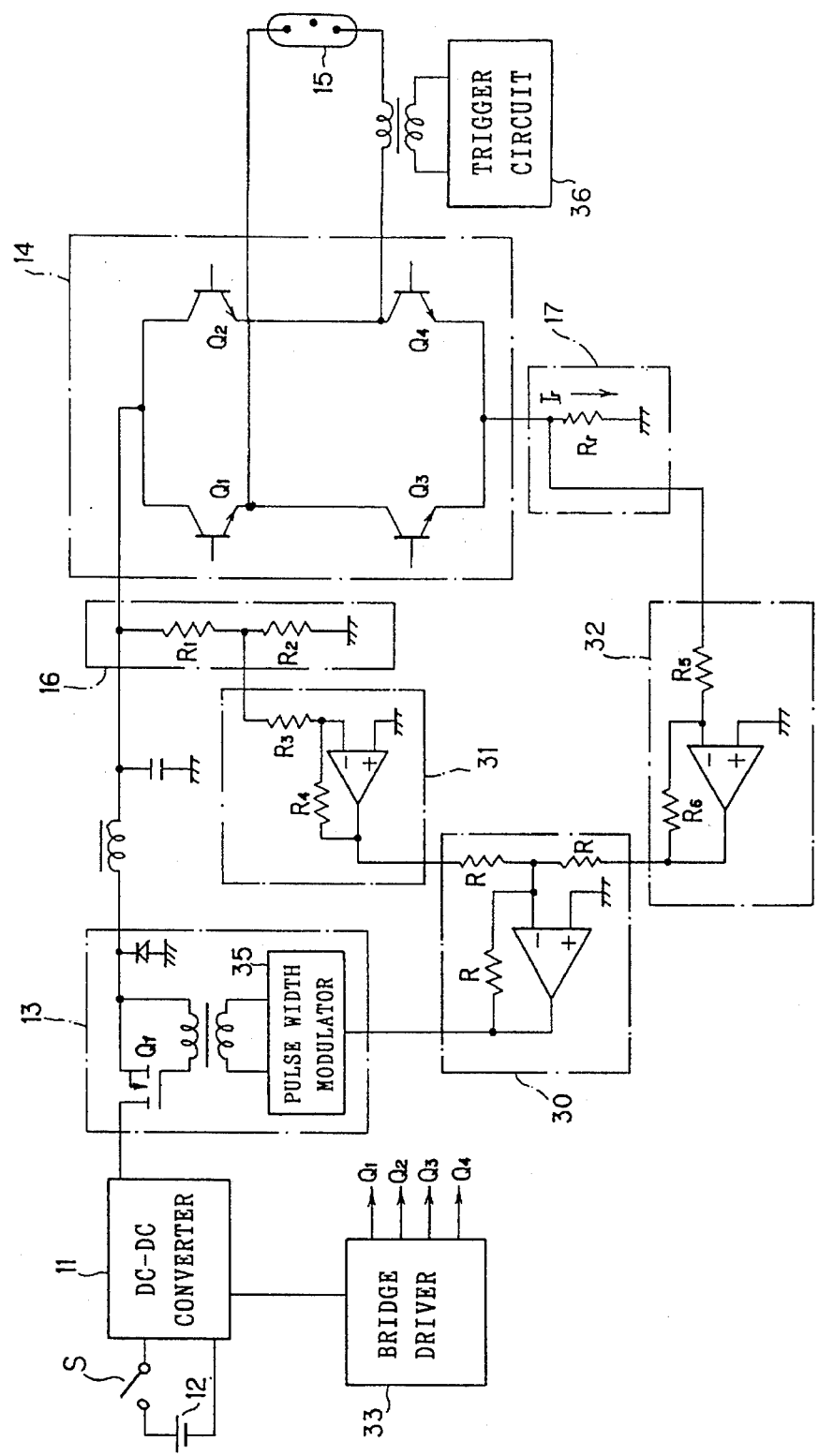
FIG. 11 is a detailed circuit diagram of FIG. 9.

FIG. 11 is a circuit diagram of the discharge lamp lighting apparatus shown in FIG. 9. In FIG. 11, the numeral 33 denotes a bridge driver for turning on or off transistors Q1 to Q4 of the bridge circuit 14. To apply an AC voltage having frequencies ranging from tens of Hz to hundreds of Hz to the lamp 15, the transistors Q1 to Q4 are turned on or off.

The PWM regulator 13 includes a transistor Qf and a pulse-width modulator 35. The pulse width of a pulse voltage is determined by the "on" duration of the transistor Qf. The pulse-width modulator 35 determines the "on" duration thereof in such a way that the modulator 35 first compares an addition signal Vc output by the adder 30 with a predetermined internal reference voltage and then if the addition signal Vc is lower than the internal reference voltage, the "on" duration is lengthened or conversely if the addition signal Vc is higher than the internal reference voltage, the "on" duration is shortened. That is, the pulse-width modulator 35 serves to control the pulse width of the pulse voltage to make the output voltage Vc of the adder 30 constant. The numeral 36 denotes a trigger circuit for applying a trigger voltage to the lamp 15 and starting a discharge when the lighting switch S is turned on.

The bridge driver 33 and the trigger circuit 36 are not shown in FIGS. 1, 2, 4, 9, and 24. A description of FIG. 24 will be given hereinafter.

If the voltage applied to the lamp 15 is V0 (this voltage can be regarded as equivalent to the input voltage of the bridge circuit 14), the output voltage V1 of the amplifier 31 is $$V1 = -V0 \cdot (R2/(R1+R2)) \cdot R4/R3 \quad (2)$$

where R2 is equal to or less than R3 (R2 <<R3).

On the other hand, if the current passing through the lamp 15 is Ir, the output voltage V2 of the amplifier 32 is $$V2 = -Ir \cdot Rr \cdot R6/R5 \quad (3)$$

where Rr is equal to or less than R5 (Rr<<R5).

Therefore, the output voltage Vc of the adder 30 is $$Vc = \{V0 \cdot R2 \cdot R4/(R3(R1+R2))\} + (Ir \cdot Rr \cdot R6/R5) \quad (4)$$

The equation (4) can be transformed into the following:

$$Vc = hV0 + 1Ir \quad (5)$$

If Vc, h, and I are replaced with Er, α, and β, respectively (Vc=Er, h=α, and 1=β), the equation (5) is completely equivalent to the equation (A) though Vi is indicated as Ir.

Figure 12:
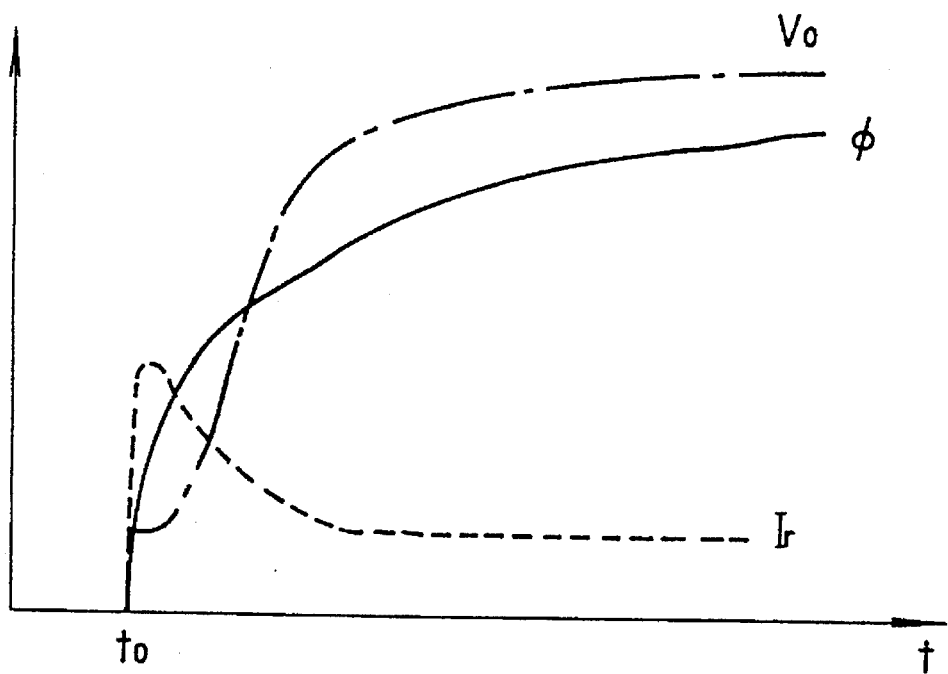
FIG. 12 is a graph showing a response characteristic.

If each is arranged as mentioned above, such a starting characteristic as shown in FIG. 12 can be obtained. This indicates that the starting characteristic is rapid and a light emitting characteristic is stable. In FIG. 12, φ is an amount of light emitted from the lamp 15, V0 is a voltage applied to the lamp 15, and Ir is a current passing through the lamp 15.

(Embodiment 5)

Figure 13:
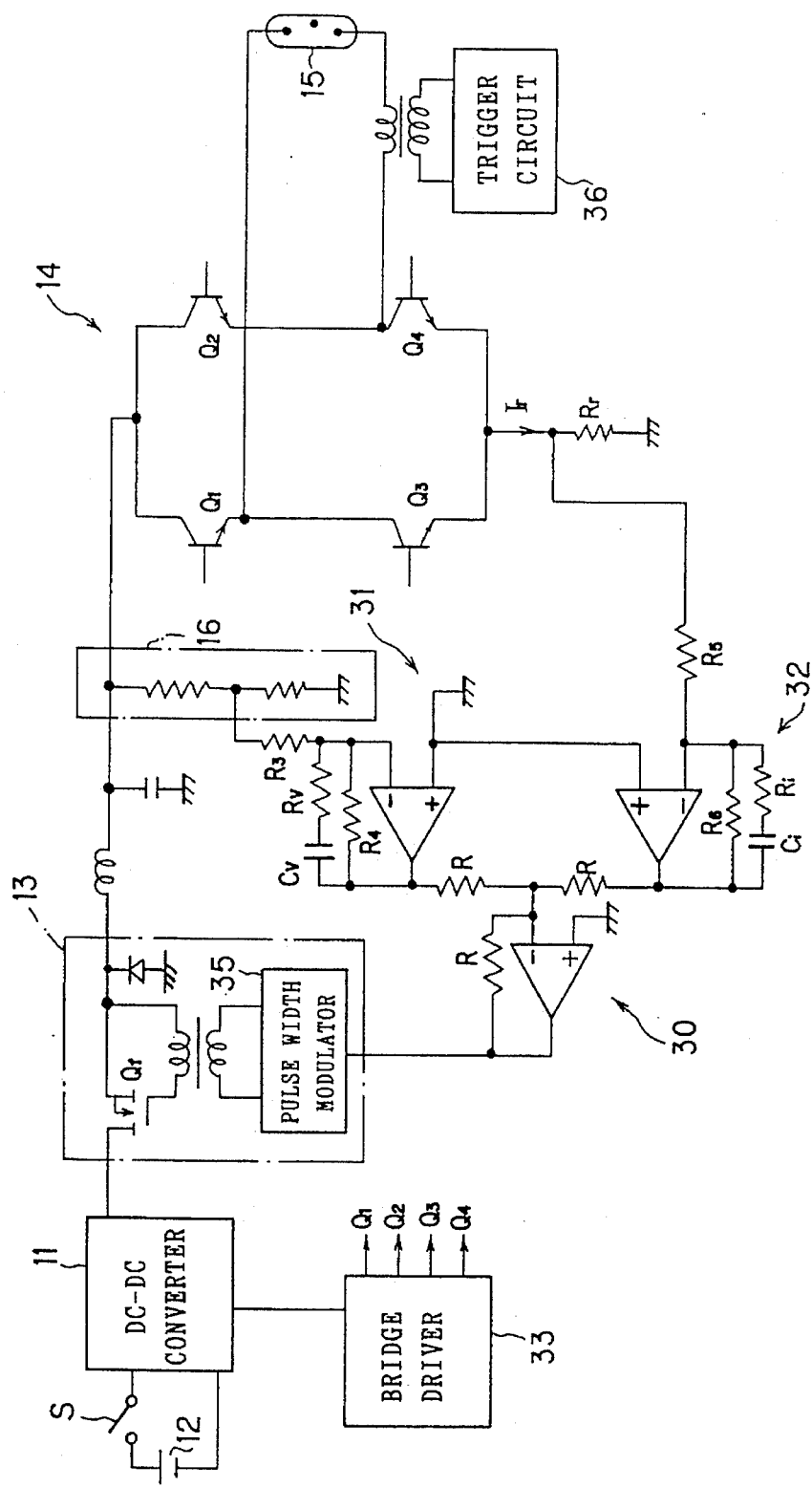
FIG. 13 is a circuit diagram of a discharge lamp lighting apparatus according to a fifth embodiment of the invention.

A discharge lamp lighting apparatus shown in FIG. 13 includes a resistance R4, a capacitor Cv, a resistance Rv, a resistance R6, a capacitor Ci, and a resistance Ri. The resistance R4 of the amplifier 31 is connected in parallel with a capacitor Cv and a resistance Rv which are connected in series with each other. The resistance R6 of the amplifier 32 is connected in parallel with a capacitor Ci and a resistance Ri which are connected in series with each other. These capacitors Cv, Ci and resistances Rv, Ri enable the rise time of the starting characteristic to be shortened. The resistance Rv and the capacitor Cv make up a first delaying means, while the resistance Ri and the capacitor Ci make up a second delaying means.

The action of the capacitor Ci and the resistance Ri each provided to the amplifier 32 will now be described hereinafter.

Figure 14:
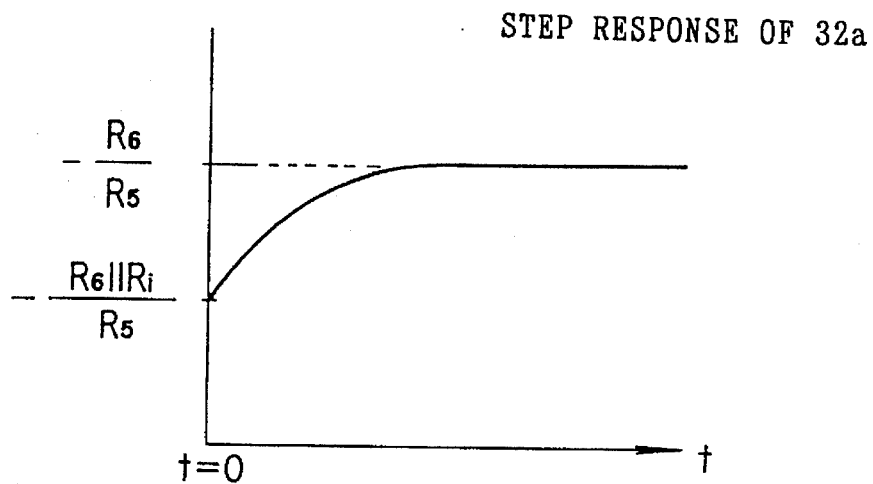
FIG. 14 is a graph showing a step response of an operational amplifier.

As shown in FIG. 14, the step response of an operational amplifier 32a has a time delay by the action of the capacitor Ci and the resistance Ri until it reaches a stationary value, i.e., a value in the constant-power control.

Figure 15:
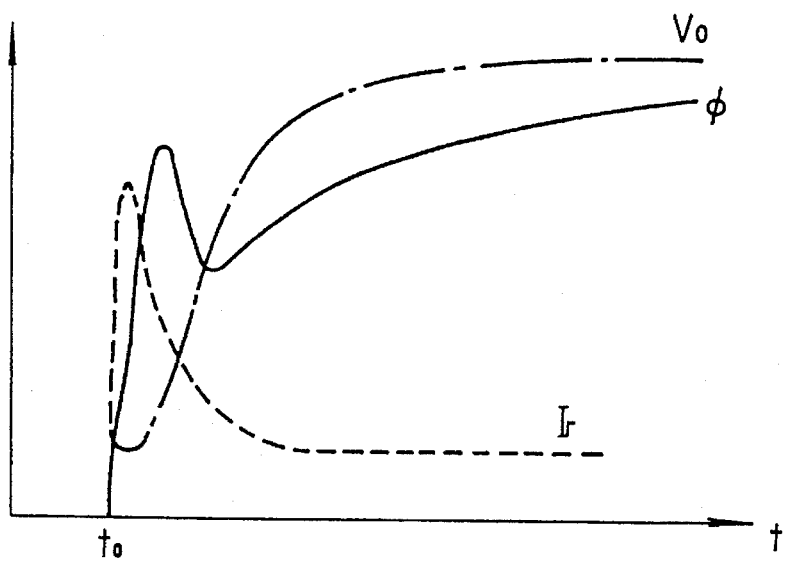
FIG. 15 is a graph showing a response characteristic in which only current is increased during a rise time.

Due to the time delay, the output voltage Vc of the adder 30 also goes on having a value less than the stationary value for a long time. Accordingly, the "on" duration of the transistor Qf of the PWM regulator 13 is lengthened and thus V0 (the voltage applied to the lamp 15) is acted on to be raised. However, since the voltage V0 can hardly be raised unless the discharge gaseous substances change in quality, the lamp current Ir is abruptly increased in the neighborhood of the point of time t0 as shown in FIG. 15.

The abrupt rise of the lamp current Ir brings about the rise of the electric power fed to the lamp 15 and therefore the rise time of the lamp 15 is shortened more at the beginning.

Preferably, the value of the resistance Ri is about twice as much as that in the rated power control, i.e., is almost equal to R6.

Further, the value of the capacitor Ci is set so that the time constant between the resistance Ri and the capacitor Ci is about 2 through 6 seconds.

The capacitor Ci and the resistance Ri cannot prevent the occurrence of a dip or hump of an amount of light emitted from the lamp 15 when a transient current is attenuated. However, by providing the capacitor Cv and the resistance Rv to the amplifier 31 additionally, such a dip or hump can be removed. In this case, the time constant between Cv and Rv is set to be large.

Figure 16:
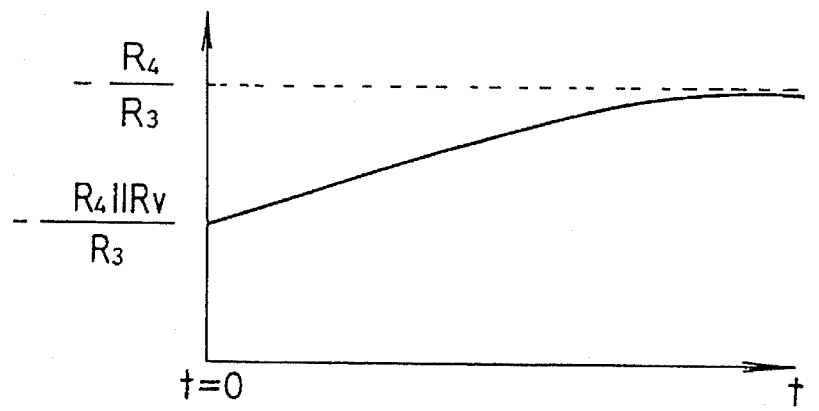
FIG. 16 is a graph showing a step response of the operational amplifier.
Figure 17:
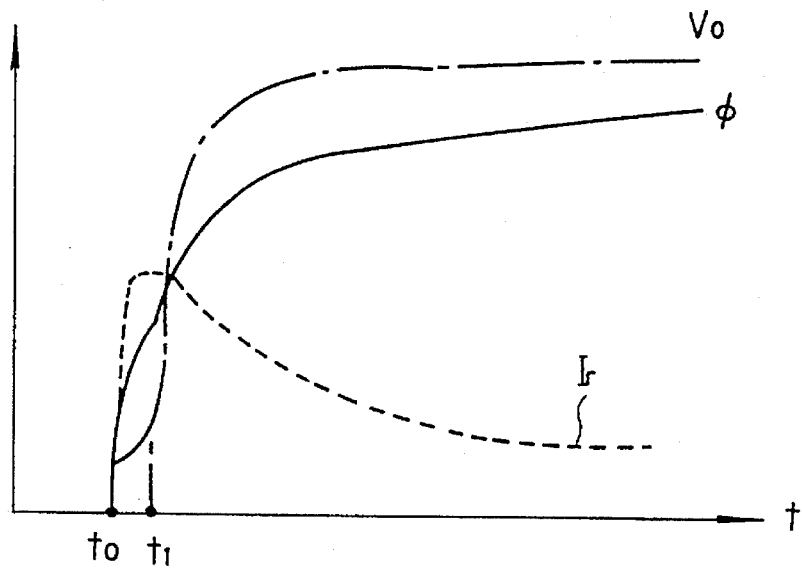
FIG. 17 is a graph showing a response characteristic in which only the rise of a voltage is hastened.
Figure 18:
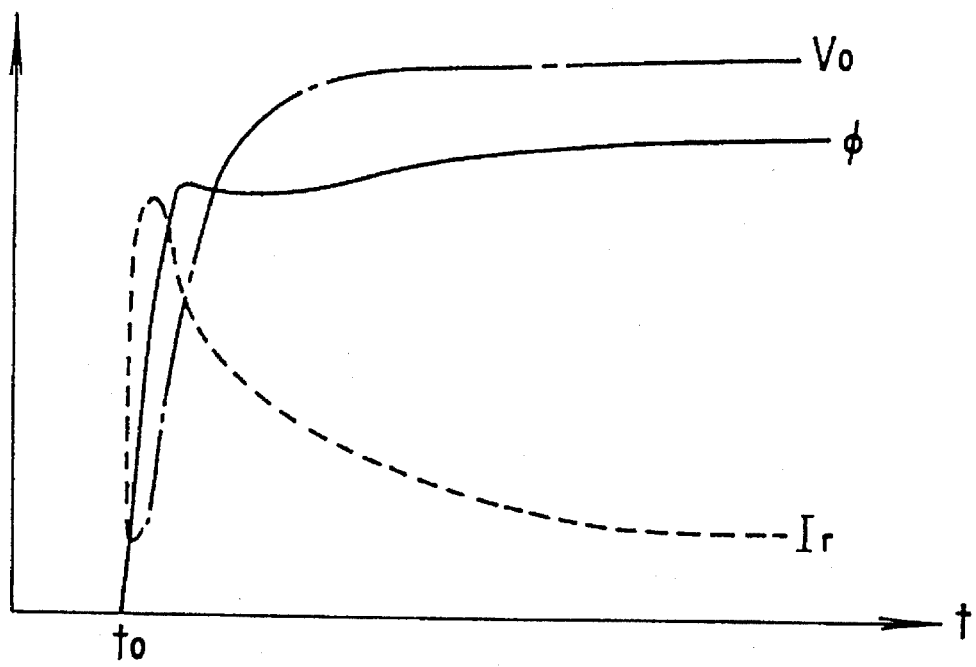
FIG. 18 is a graph showing a response characteristic in which current is increased during the rise time and the rise of the voltage is hastened.

If the capacitor Cv and the resistance Rv are provided to only the amplifier 31, the step response of the operational amplifier 31a slowly rises as shown in FIG. 16 because the time constant is large. The starting characteristic in this case is shown in FIG. 17 in which the current Ir for the initial duration of lighting continues to run regardless of the rise of the voltage V0 applied to the lamp 15 because the rise of the output voltage of the operational amplifier 31a is delayed by the action of the capacitor Cv and the resistance Rv. Therefore, the electric power fed to the lamp 15 until the transient characteristic is attenuated is larger than that in the constant-power control. The voltage V0 abruptly rises after the lapse of a certain period of time from the starting (in the neighborhood of the point of time t1 in FIG. 17).

Preferably, as a result of experiments, the value of the resistance Rv is about the value of R6, and the value of Cv is such that the time constant is about 10 to 15 seconds.

By combining those shown in FIGS. 15 and 17 with each other, a characteristic is attained in which the rise time is still shorter and the dip or hump hardly occurs after the stationary state of lighting.

(Embodiment 6)

Figure 19:
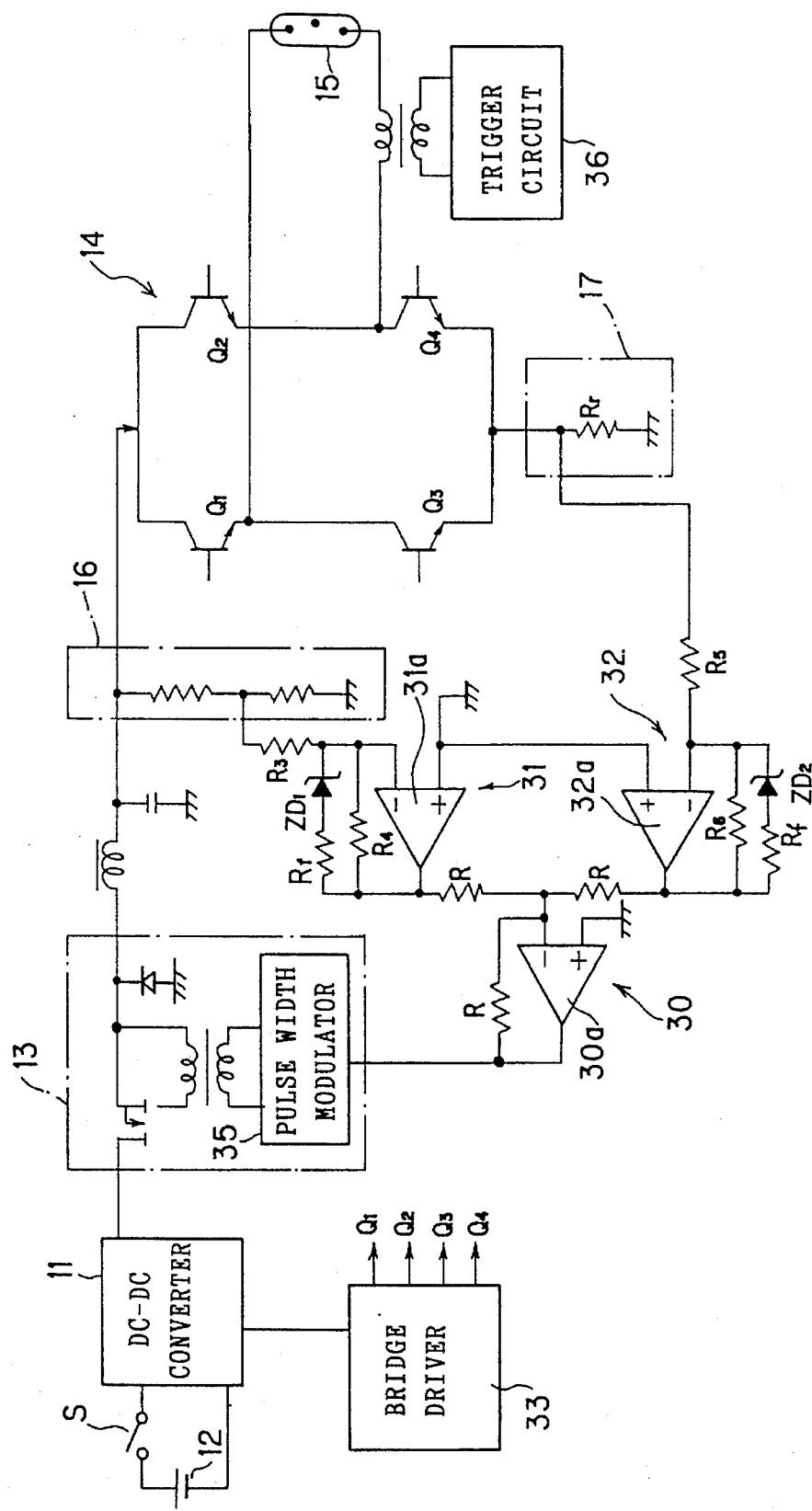
FIG. 19 is a circuit diagram of a discharge lamp lighting apparatus according to a sixth embodiment of the invention.

A discharge lamp lighting apparatus shown in FIG. 19 includes resistances Rf, Rf and Zener diodes ZD1, ZD2 instead of the capacitors Cv, Ci and the resistances Rv, Ri each shown in FIG. 13. Rf and ZD1 which are connected in series with each other make up a first controlling means, while Rf and ZD2 which are connected in series with each other make up a second controlling means. A breakdown voltage requisite for the Zener diodes ZD1, ZD2 is more than Er/2.

Figure 20:
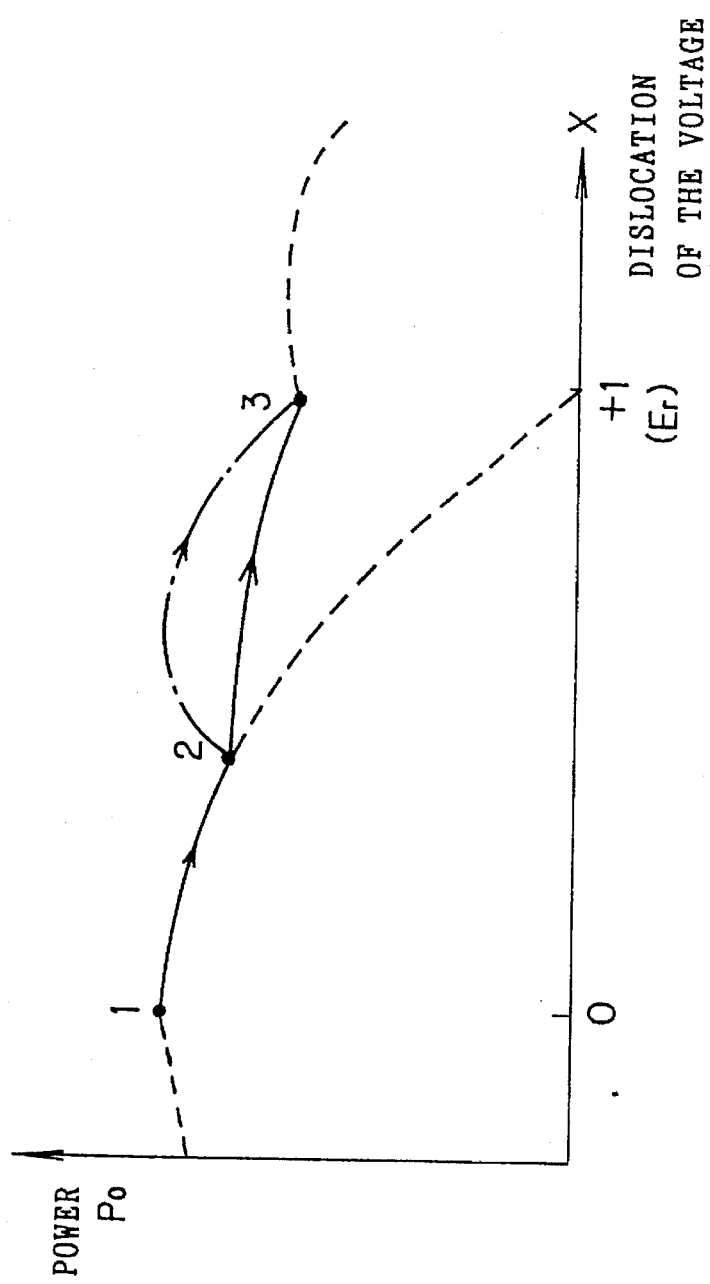
FIG. 20 is a graph showing the relationship between a discrepancy of a lamp voltage and electric power in the sixth embodiment.

As shown FIG. 10, when the output voltage of the operational amplifier 31a is more or less than Er/2, the output power of the PWM regulator 13 steps down from the rated power according to a difference from Point X=0. Therefore, ZD1 is set to be a little more than Er/2. If the voltage applied to the lamp 15 is raised to make the output voltage of the operational amplifier 31a be more than Er/2 and hence the output voltage of the adder 30 is dislocated from Point 1 to Point 2 as shown in FIG. 20, a feedback resistance becomes a parallel value of Rf and R4 by the action of ZD1 and Rf, and then the gain of the operational amplifier 31a is decreased. Accordingly, the output voltage of the operational amplifier 31a drops and the difference (X) of the voltage from a reference value become small actually. As shown in FIG. 20, the curve from Point 2 to Point 3 is gradual in slope and therefore the range of the constant-power control is widened. According to the value Rf, the electric power P0 can be increased as shown by the alternate long and short dash line in FIG. 20.

Likewise, if the portion shown by the stitch line is increased (i.e., if a Zener diode and a resistance are added), an effect is heightened much more. If the same processing as above is given to the operational amplifier 32a, an effect on the case where the voltage of the lamp 15 drops is gained. Further, the constant-power control can be carried out even if there is a big difference (X).

(Embodiment 7)

Figure 21:
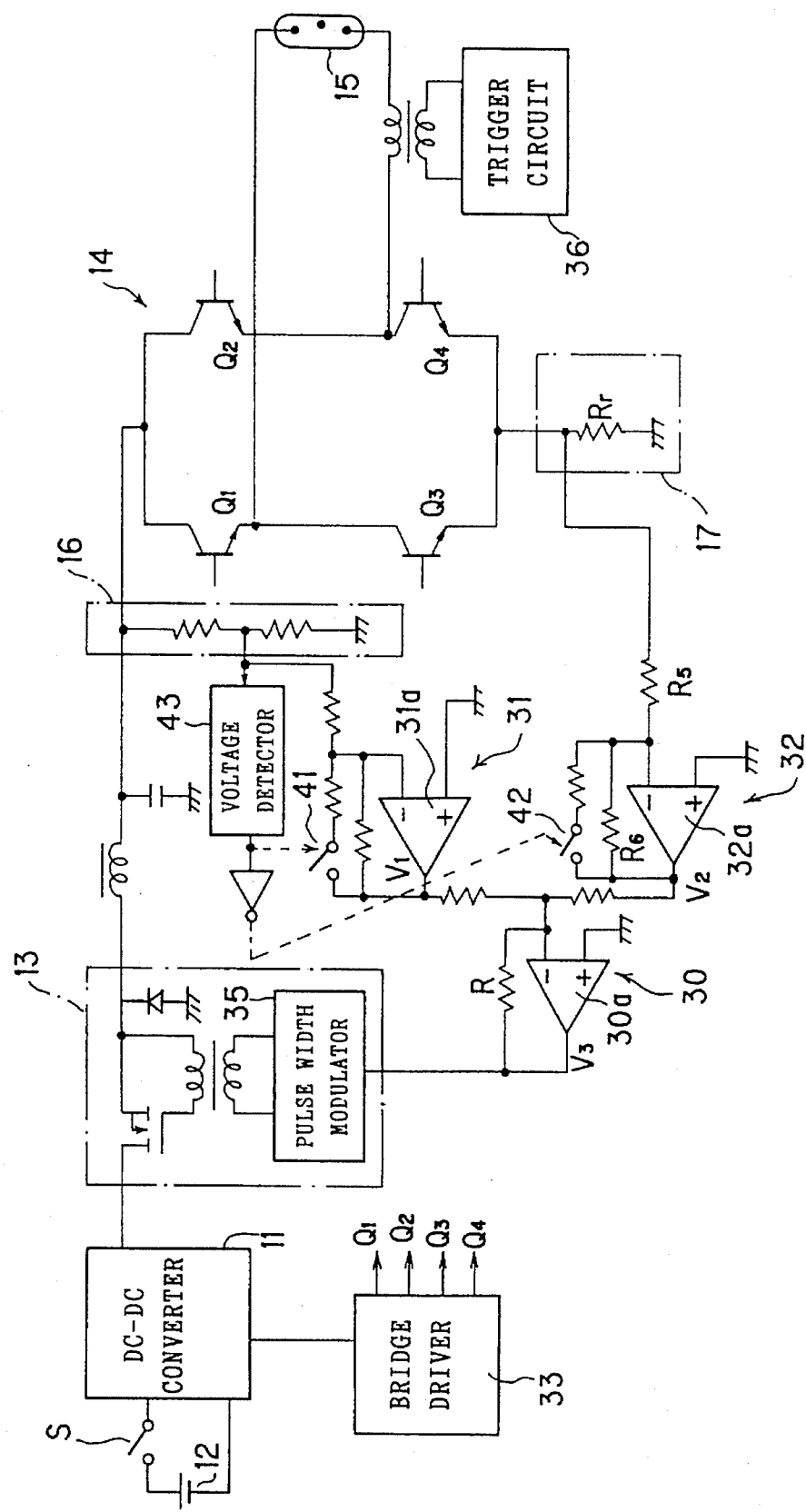
FIG. 21 is a circuit diagram of a discharge lamp lighting apparatus according to a seventh embodiment of the invention.

A discharge lamp lighting apparatus shown in FIG. 21 includes analogue switches 41, 42 instead of the Zener diodes ZD1, ZD2. Referring to FIG. 21, the numeral 43 denotes a voltage detecting circuit for detecting the voltage output by the voltage detecting circuit 16, the numeral 41 is a switch which is turned on when the voltage detected by the voltage detecting circuit 43 is more than a given voltage, the numeral 42 is a switch which is turned on when the voltage detected by the voltage detecting circuit 43 is less than the given voltage, and the numeral 44 denotes an inverter.

When the lighting switch S is turned on, the lamp 15 begins to light by the trigger circuit 36. The terminal voltage of the lamp 15 at this moment is 25 volts or so. This voltage is far less than the rated voltage (85 volts).

The lamp voltage Vv is monitored by the voltage detecting circuit 43. If the voltage Vv is less than 65 volts, the analogue switch 41 is turned off, while the analogue switch 42 is turned on so that the output voltage of the operational amplifier 32a becomes low. The output voltage V3 of the adder 30 is $$V3 = V1 + V2 \tag{10}$$

where V1 is the output voltage of the amplifier 31a and V2 is the output voltage of the amplifier 32a. The pulse-width modulator 35 compares the voltage V3 with an internal reference voltage. If V3 is larger than the internal reference voltage, i.e., the electric power fed to the lamp 15 is larger than a reference value, the pulse width is made narrow to lessen the power fed to the lamp 15. On the other hand, if V3 is less than the internal reference voltage, i.e., the electric power fed to the lamp 15 is less than the reference value, the pulse width is made wide to heighten the power fed to the lamp 15. As a result, the pulse width becomes constant when Er equals V3. In other words, equilibrium is attained under the pulse width bringing about a constant electric power.

Let it be supposed that the output voltage of the operational amplifier 31a is −V1, the lamp current is I1, and the output voltage of the operational amplifier 32a is V2 when the lamp voltage is V0. The power P1 fed to the lamp 15 is $$P1 = V0 \times I1 \tag{11}$$

The output voltage V3 of the adder 30 at this moment is $$V3 = V1 + V2 \tag{12}$$

Supposing that V1=V2=Er/2, as the discharge voltage of the lamp 15 is gradually raised, V1 is also raised. However, V2 is decreased under the following condition:

$$V2 = Er - V1 \tag{13}$$

In other words, both the lamp current and the power fed to the lamp 15 are decreased.

Since V1 equals A1Vv and V2(=Er−V1) corresponds to A2 α I1, the variation of the power in this case is expressed as follows:

$$\begin{aligned} P1 &= V1 \times I1 = V1(Er - V1)/A1 \cdot A2 \cdot \alpha \\ &= A(ErV1 - V1^2) \\ &= A\{-(V1 - Er/2)^2 + Er/4\} \end{aligned}$$

where A1 and A2 are amplification degrees of the operational amplifiers 31a and 32a, respectively.

Figure 22:
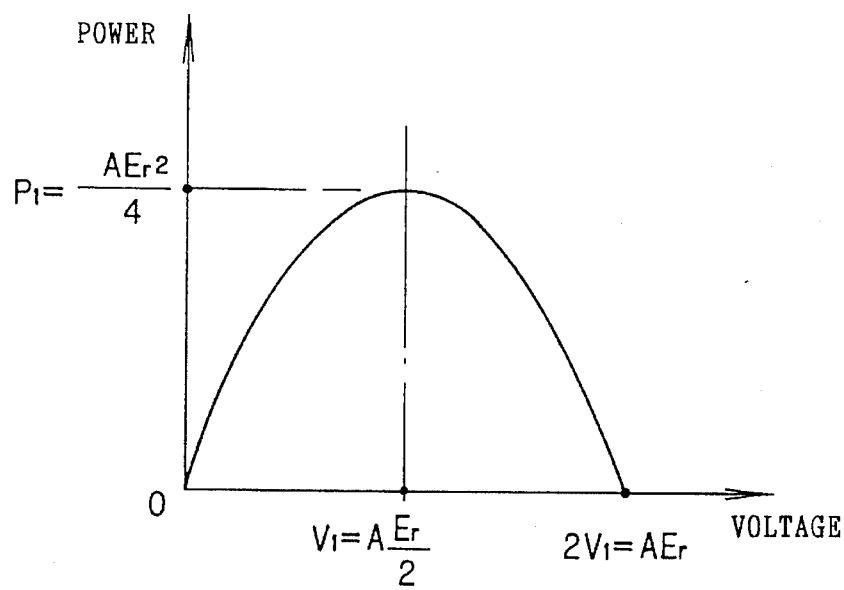
FIG. 22 is a graph showing the relationship between a lamp voltage and electric power of the lamp.

Since A and Er are each constant, the relation between P1 and V1 is expressed as a negative secondary function as shown in FIG. 22. That is, under the condition V1=V2=Er/2, the power fed to the lamp 15 has the peak at the point where V1 equals Er/2, and the power is decreased regardless of the rise and fall of V1 (corresponding to the lamp voltage). The variation of the power in the neighborhood of the point Er/2 is very moderate. To adjust the power fed to the lamp 15 according to the voltage and current characteristic (impedance) of the lamp 15, P1 is first set two to three times as much as the rated power. Then, the amplification degrees of the circuits of the amplifiers 31 and 32 are switched and the lamp 15 is lighted. When V1 is increased and P1 reaches near the rated power P0, the amplification degrees of the amplifiers 31 and 32 are switched so that the rated voltage and the rated power each have a peak at that moment.

In more detail, when the lamp voltage Vv is less than 65 volts, i.e., when the lamp 15 begins to light, the switch 41 is turned off and the switch 42 is turned on so as to make the attenuation of the lamp voltage Vv relatively small and to make the attenuation of the lamp current I large. When the lamp voltage Vv is V1, high electric power is set to be fed. When the lamp voltage Vv surpasses 65 volts, the switch 41 is turned on and the switch 42 is turned off to make the attenuation of the lamp voltage Vv relatively large and, to make the attenuation of the lamp current I small and to set the rated power P0 responsive to the rated voltage V0.

Such an arrangement as mentioned above enables the rise time of the lamp 15 to be shortened very much because electric power almost equal to the rated power can be fed.

(Embodiment 8)

Figure 24:
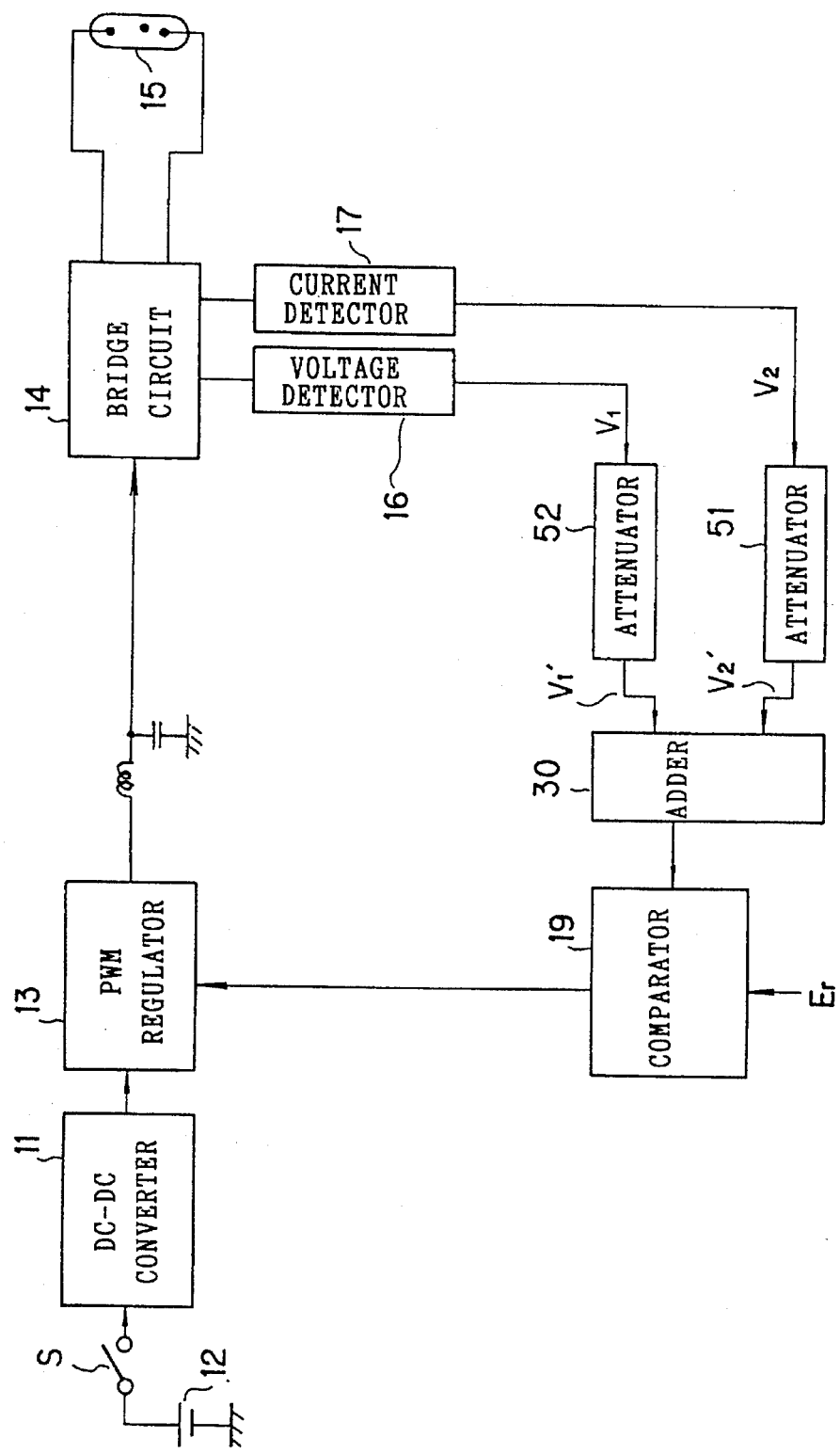
FIG. 24 is a block diagram showing a construction of a discharge lamp lighting apparatus according to an eighth embodiment of the invention.

Referring to FIG. 24, the numerals 51 and 52 denote non-linear attenuators connected to the front of the adder 30. The attenuator 52 serves as a first attenuating means, while the attenuator 51 serves as a second attenuating means.

When the lamp 15 starts lighting by the trigger circuit (not shown), the voltage of the lamp 15 is low because the principal component of the discharge gas in the lamp 15 is xenon. Therefore, the voltage V1 of a voltage detection signal detected by the voltage detecting circuit 16 is low and accordingly the current I of the lamp 15 is increased because the output voltage of the adder 30 becomes equal to the reference voltage Er.

Supposing that the value of the resistance Rr (see FIG. 21) is α, the voltage V2 of a current detection signal output by the current detecting circuit 17 is $$V2=\alpha I$$

Since the voltage V2 is attenuated by the attenuator 51, the current passing through the lamp 15 is increased more.

Figure 25:
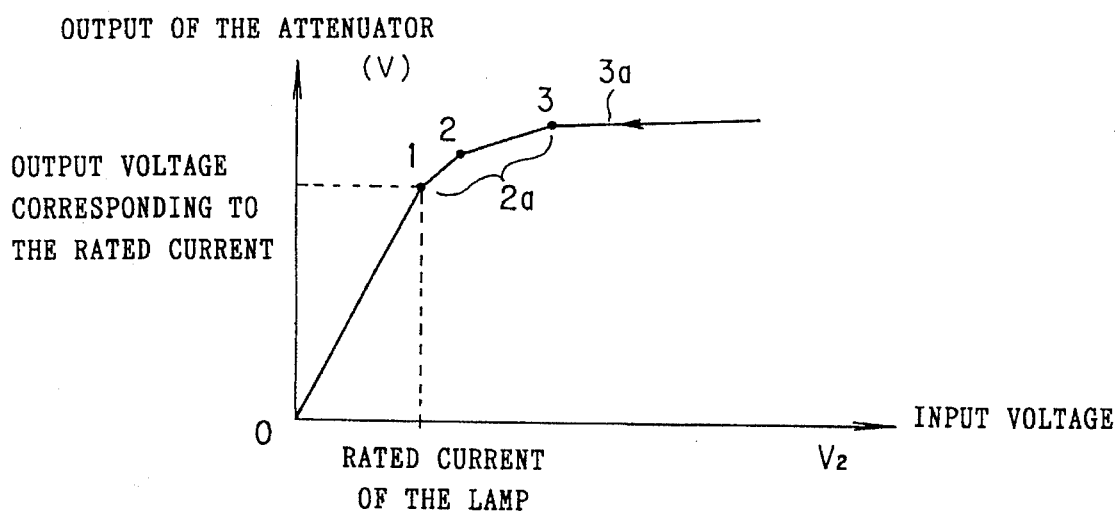
FIG. 25 is a graph showing the relationship between an output of an attenuator and a voltage detected by a voltage detecting circuit.

As shown in FIG. 25, the attenuator 51 is arranged so that a response to a large amount of current is very slight. Since the lamp voltage Vv and the voltage V1 detected by the voltage detecting circuit 16 are low at the beginning of lighting, the lamp 15 requires a large amount of current in order to satisfy the following equilibrium condition:

$$V1+V2=Er$$

Figure 26:
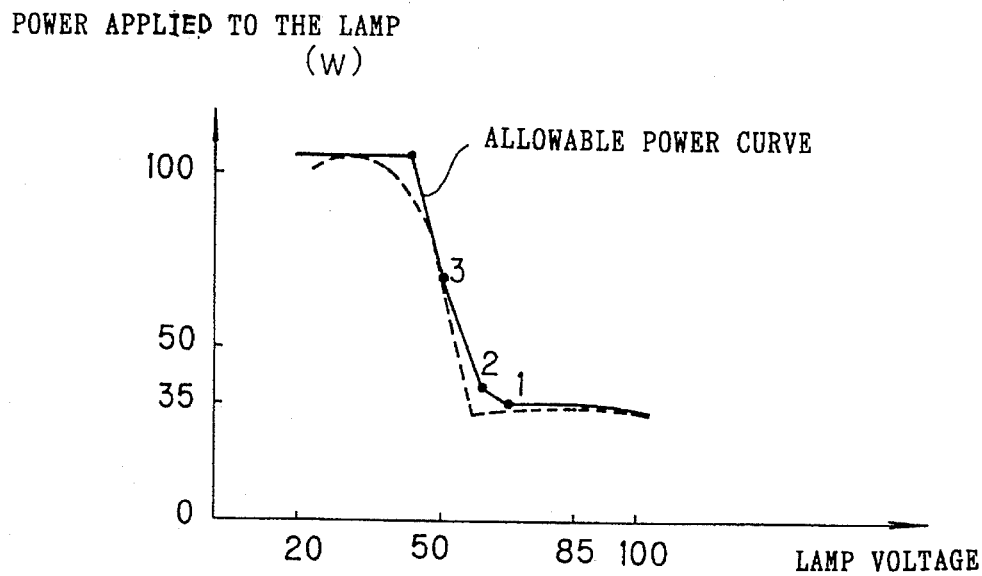
FIG. 26 is a graph showing the relationship between a lamp voltage and electric power fed to the lamp.

As shown in FIG. 26, the lamp current at the beginning of lighting is arranged so that the electric power of 100 W is applied to the lamp of 35 W. If the power applied to the lamp 15 is adjusted along the allowable power curve (solid line) shown in FIG. 26, the most rapid response can be obtained. In this embodiment, the curve is continuously approximated to shorten the rise time. The stitch line in FIG. 26 indicates a characteristic curve of the circuit shown in FIG. 21.

As the lamp 15 is heated and the lamp voltage is increased, the lamp current is decreased and then the voltage V2 of the current detection signal output by the current detecting circuit 17 is decreased in order to satisfy the equilibrium condition. That is, as shown in FIG. 25, the lamp current undergoes a great variation (corresponding to the portion 3a), it then undergoes a moderate variation (corresponding to the portion 2a), and it undergoes a linear variation.

Figure 27:
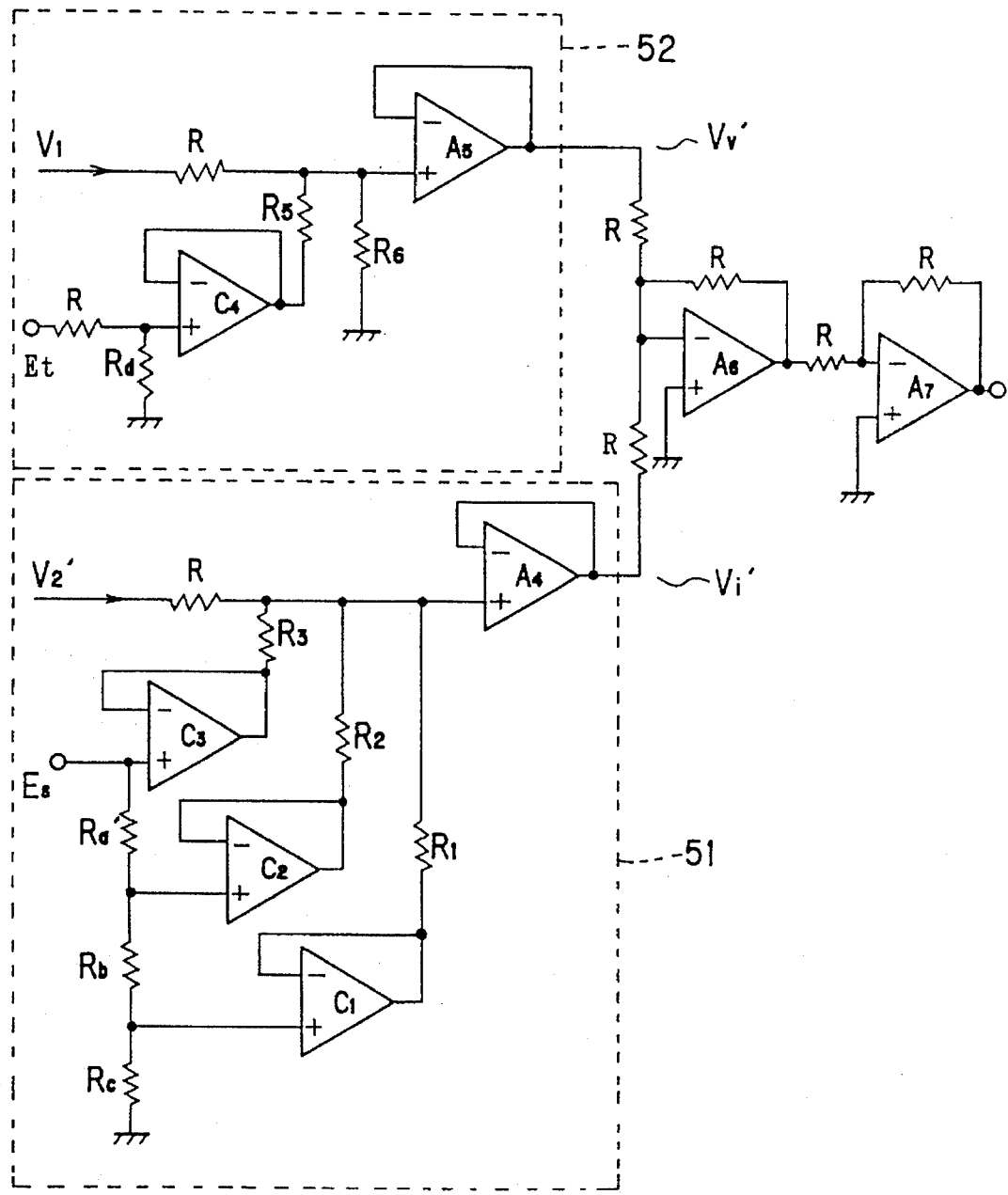
FIG. 27 is a circuit diagram of the attenuator.

As shown in FIG. 27, the attenuators 51 and 52 are non-linear attenuating circuits employing open-collector type of comparators C1 to C4. The attenuators 51 and 52 have better characteristics in stability and set-accuracy than those employing transistors or diodes. The attenuator 51 divides the reference voltage Es at Ra, Rb, and Rc and then inputs the resultant partial voltages as respective reference voltages of the comparators C1, C2, and C3 to non-inversion terminals. The output terminals of the comparators C1 to C3 are connected to the current detecting circuit via the resistances R1 to R3, and. R. A4 denotes a calculating amplifier. If the output voltage V2 of the current detecting circuit 17 is zero, the comparators C1 to C3 are turned off and the resistances R1 to R3 are disconnected.

When the output voltage V2 of the current detecting circuit 17 is increased, a negative phase input voltage via the resistors R and R1 surpasses the partial voltages of Es and then the comparator C1 is turned on. Accordingly, the voltage V2 undergoes the attenuation of R1/(R+R1). The point where this attenuation is undergone is Point 1 in FIG. 26. Rc is selected to surpass the partial voltages of Es at Point 1.

Further, when the output voltage V2 is increased, the comparator C2 is turned on and then the voltage Vb undergoes the attenuation of a parallel combined resistance of R1 and R2. This attenuation is expressed as follows:

$$\{R1R2/(R1+R2)\}/\{R+(R1R2/(R1+R2))\} = R1R2/\{R(R1+R2)+R1R2\}$$

The point where this attenuation is undergone is Point 2 in FIG. 26. Rb is selected to surpass the partial voltages of Es at Point 2.

Further, when the output voltage V2 is increased, the comparator C3 is turned on and then the voltage V2 undergoes the attenuation of a parallel combined resistance of R1, R2, and R3. The point where this attenuation is undergone is Point 3 in FIG. 26. Es is selected to start the attenuation at Point 3.

If the lamp voltage is lower than the rated voltage (85 volts), the lamp 15 is swiftly actuated and then changed to a stationary state.

If the lamp voltage surpasses the rated voltage, the power applied to the lamp 15 is gradually decreased along the quadratic curve. On the other hand, the output voltage V1 of the voltage detecting circuit 16 is increased. However, since the voltage V1 is attenuated by the attenuator 52, the reduction of the current passing through the lamp 15 is suppressed and therefore the constant-power characteristic is improved.

That is, when the voltage V2 is increased and C4 is turned on, the voltage V2 undergoes the attenuation of $$(R5R6/(R5+R6))/\{R+(R5R6/(R5+R6))\}$$

Figure 23:
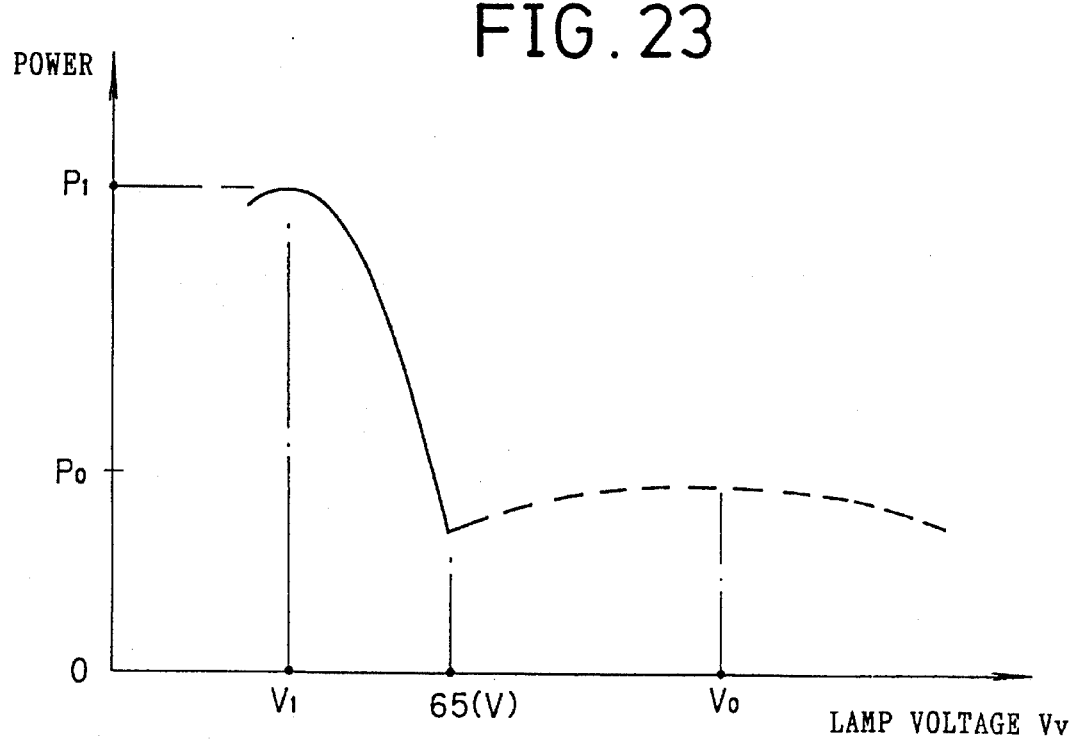
FIG. 23 is a graph showing the relationship between a lamp voltage and electric power of the lamp shown in FIG. 21.
Figure 28:
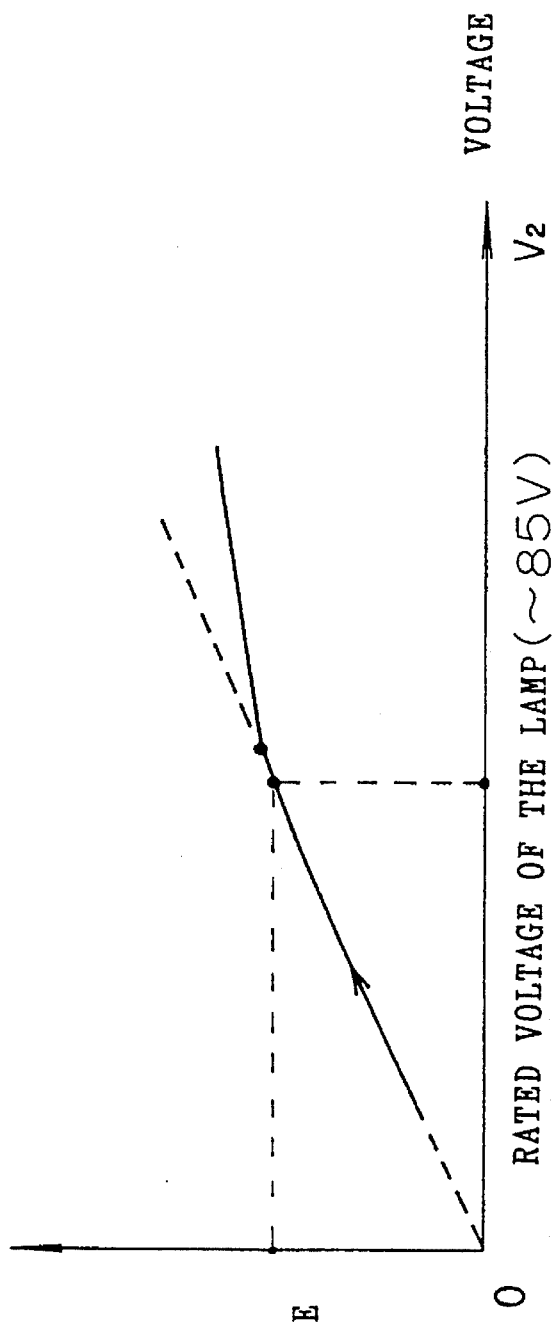
FIG. 28 is a graph showing the relationship between an output of the attenuator and a voltage detected by the voltage detecting circuit.

If the lamp voltage is more than the rated voltage, the output voltage V2 of the current detecting circuit 17 becomes less than the specified voltage. Accordingly, the voltage V2 is linearly decreased as shown in FIG. 28. After the lamp voltage reaches the voltage V0, the power applied to the lamp 15 is gradually decreased as shown in FIG. 23. The attenuator 52 serves to prevent such a disadvantage.

As shown in FIG. 25, if the attenuation is enlarged from Point 2 where the voltage is a little more than the rated voltage (85 volts) and is less than 125 volts (for example, where the voltage is 92 volts or so), the drop of the lamp voltage can be suppressed and therefore the power applied to the lamp 15 can be increased.

In the specification of the operating voltage of the lamp 15, the upper limit is 102 volts, while the standard rated voltage is 85 volts. Since the range is narrow, only one point suffices for the correction.

As mentioned above, since the attenuators 51 and 52 act to make the starting of lighting the lamp 15 rapid and further exercise a constant-power control upon a wide range, a characteristic of uniformly emitting light can be obtained even in a scattering discharge lamp. The comparator 19 is shown in FIGS. 1, 2, 4, and 24, while it is not shown in FIGS. 9, 11, 13, 19, and 21. The reason is that the pulse width modulator 35 of the PWM regulator 13 generally serves as the comparator 19. In FIGS. 1, 2, 4, and 24, the comparator 19 is shown for convenience of illustration.

(Embodiment 9)

Figure 29:
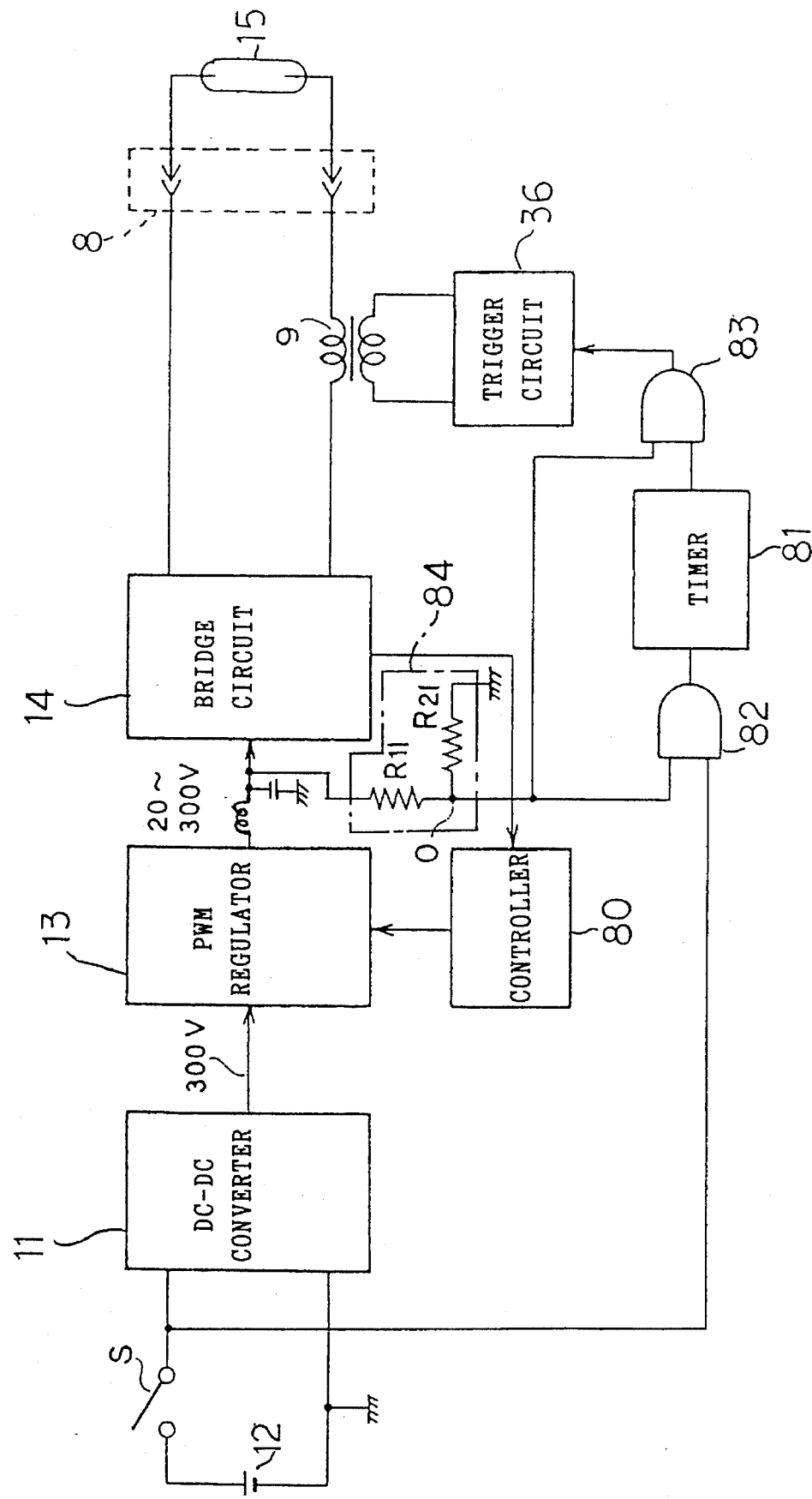
FIG. 29 is a block diagram showing a construction of a discharge lamp lighting apparatus according to a ninth embodiment of the invention.

FIG. 29 shows a discharge lamp lighting apparatus in which a trigger is immediately applied to the lamp 15 to light the lamp 15 again even when the lamp 15 was extinguished owing to temporary disconnection of the connector 8 and so forth.

Figure 30:
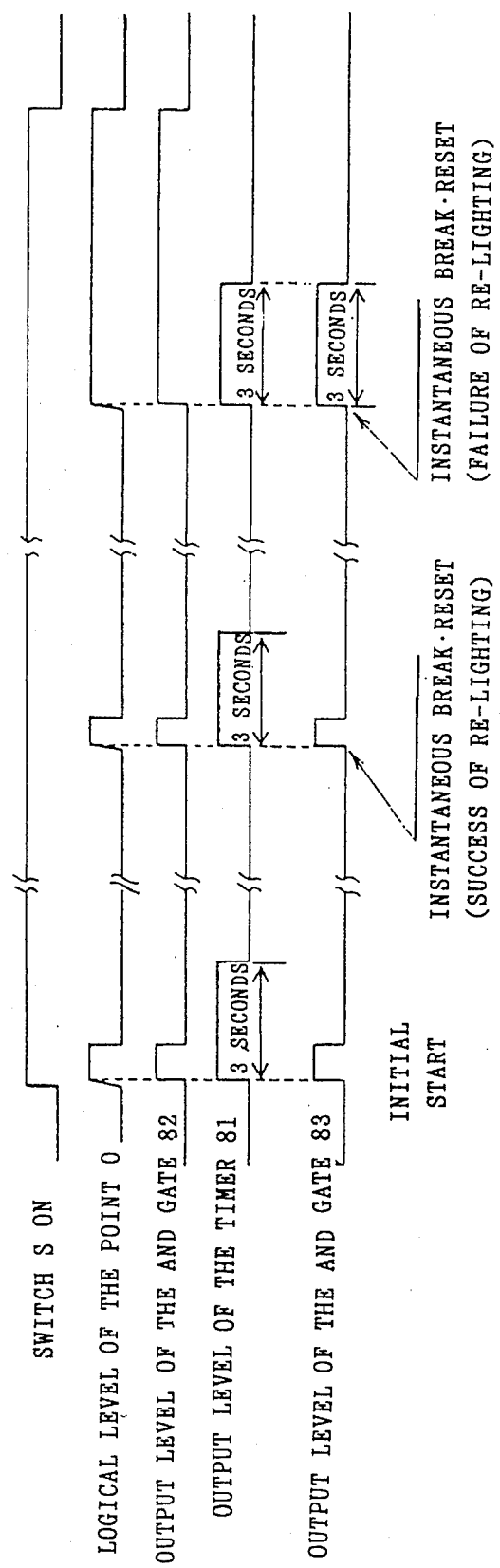
FIG. 30 is a time chart in the ninth embodiment.

Referring to FIG. 29, the numeral 80 denotes a controller made up of the voltage detecting circuit 17, the multiplier 18, and the comparator 19, each shown in FIG. 1. The numeral 81 denotes a timer for actuating the trigger circuit (starting means) 36 within a given time after the switch S is turned on, and the numerals 82, 83 denote AND circuits. The resistances R11, R12 make up a circuit (means) for detecting an instantaneous state of supplying no power to the lamp 15. Instead of the resistances R11, R12, the voltage detecting circuit 16 may be used. When the switch S is turned on, the DC-DC converter 11 generates a DC voltage of about 300 volts and then the regulator 13 adjusts and outputs a pulse voltage of 20 to 300 volts according to the load resistance (the lighting state) of the lamp 15. The bridge circuit 14 converts the pulse voltage of 20 to 300 volts into an AC voltage and applies the AC voltage to the lamp 15 via the connector 8. The controller 80 controls the lamp 15 so that it does not to apply more than the rated voltage the lamp 15 and further controls the regulator 13 according to the lighting state of the lamp 15. On the other hand, the no-supply detecting circuit 84 outputs an H-level (high-level) signal because the output voltage of the regulator 13 becomes 300 volts when the lamp 15 is not lighted. The H-level signal output by the circuit 84 is input to an input terminal of each of the AND circuits 82, 83. Since the H-level signal is input to the other input terminal of the AND circuit 82 by turning on the switch S, an H-level signal is output by the AND circuit 82. This H-level signal actuates the timer 81 to output an H-level signal. The H-level signal output by the timer 81 is input to the other input terminal of the AND circuit 83. The H-level signal output from the output terminal of the AND circuit 83 actuates the trigger circuit 33. The trigger circuit 33 acts to apply a high-voltage trigger pulse to the lamp 15 in order to light the lamp 15. When the lamp 15 is lighted, the output voltage of the regulator 13 is immediately decreased to 20 to 90 volts and the output level of the no-supply detecting circuit 80 becomes L-level (low-level). The output levels of the AND circuits 82, 83 each become L-level and accordingly the trigger circuit 36 stops applying the high-voltage trigger pulse to the lamp 15. FIG. 30 is a timing chart showing these actions.

The timer 81 stops the operation of the trigger circuit 36 when a given time collapses after turning on the switch S. Therefore, if the lamp 15 is not lighted, the timer 81 can avoid a danger of the continuous application of the high-voltage trigger pulse to the lamp 15 and the connector 8.

If, after the lamp 15 is lighted, the connector 8 and so forth are temporarily disconnected owing to, e.g., vibrations and accordingly the discharge of the lamp 15 is attenuated, the output levels of the no-supply detecting circuit 80 and the AND circuit 82 are changed from L-level to H-level because the output voltage of the regulator 13 immediately becomes 300 volts by the controller 80. The timer 81 then causes the AND circuit 82 to output an H-level signal and the trigger circuit 36 is actuated. Therefore, the temporary or complete extinction of the lamp 15 is avoidable.

(Embodiment 10)

Figure 31:
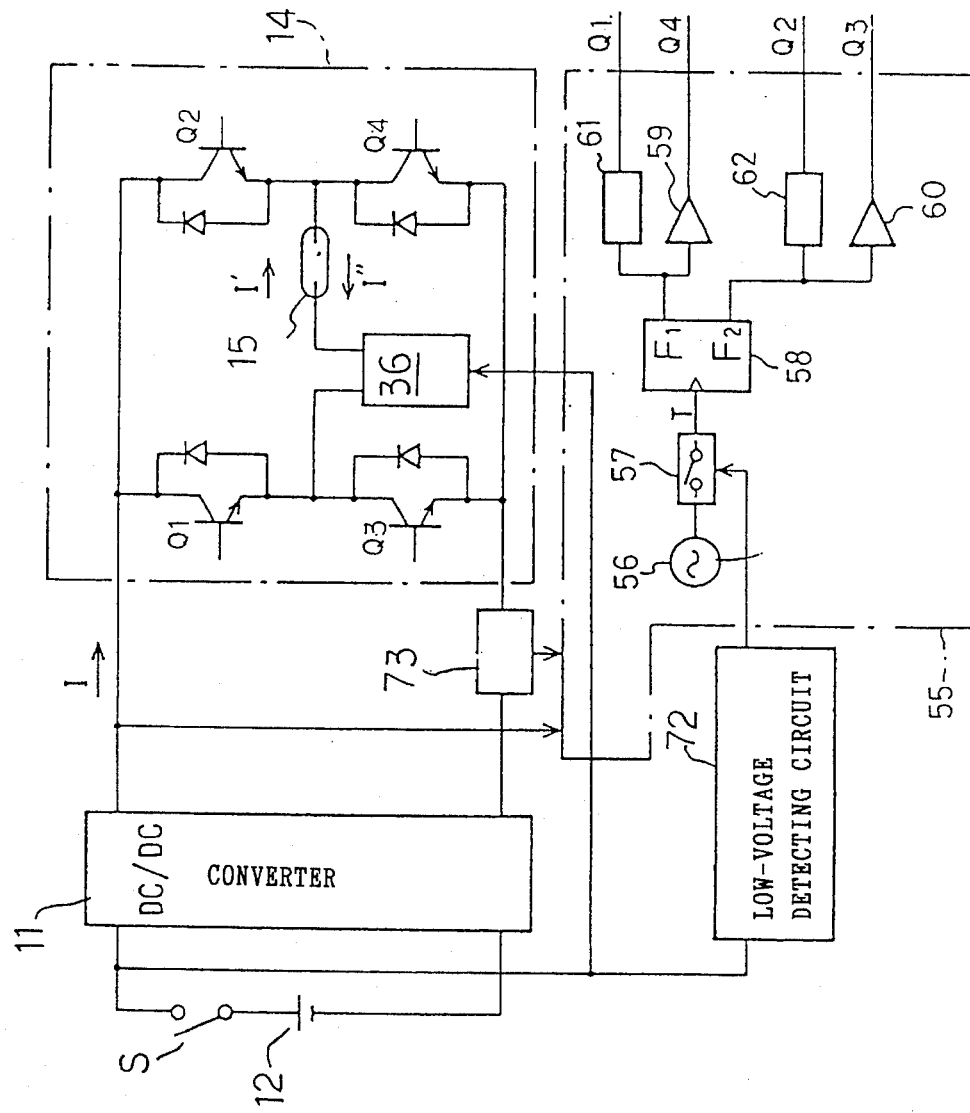
FIG. 31 is a block diagram showing a construction of a discharge lamp lighting apparatus according to a tenth embodiment of the invention.

FIG. 31 shows a discharge lamp lighting apparatus in which the lamp 15 can remain lighting even if the voltage (source voltage) of the battery 12 falls. Referring to FIG. 31, the numeral 55 denotes a controlling circuit including a pulse-width modulating circuit and a bridge driver (each not shown). The controlling circuit 55 further includes a transmitting circuit 56 for determining a switching frequency of the bridge driver, an analogue switch 57, a flip flop 58, buffers 59, 60 connected to the base of the transistors Q4, Q3 for conducting the transistors Q4, Q3, and photo couplers 61, 62 connected to the transistors Q1, Q2 for conducting the transistors Q1, Q2.

The numeral 72 denotes a low-voltage detecting circuit (low-voltage detecting means) for detecting the voltage of the battery 12 less than a given voltage and turning off the analogue switch 57, and the numeral 73 denotes a current detecting circuit for detecting the current passing through the bridge circuit 14.

The low-voltage detecting circuit 72 detects the voltage of the battery 12 via the switch S and causes the analogue switch 57 to be turned on when the voltage of the battery 12 is more than a given voltage (for example, 8 volts) and then transmits the output (tens to hundreds of Hz) of the transmitting circuit 56 to the flip flop 58. The flip flop 58 halves the output frequency of the transmitting circuit 56 and changes the duty ratio of an output pulse to 50%.

When the output terminal F1 of the flip flop 58 is H-level, the transistors Q1 and Q4 are turned on by the photo coupler 61 and the buffer 59, while the transistors Q2, Q3 are turned off because the output terminal F2 is L-level. Accordingly, the current I' runs through the lamp 15.

On the other hand, when the terminal F2 is H-level, the transistors Q2, Q3 are turned on, while the transistors Q1, Q4 are turned off. Accordingly, the current I" opposite in flow direction to the current I' runs through the lamp 15.

Figure 32:
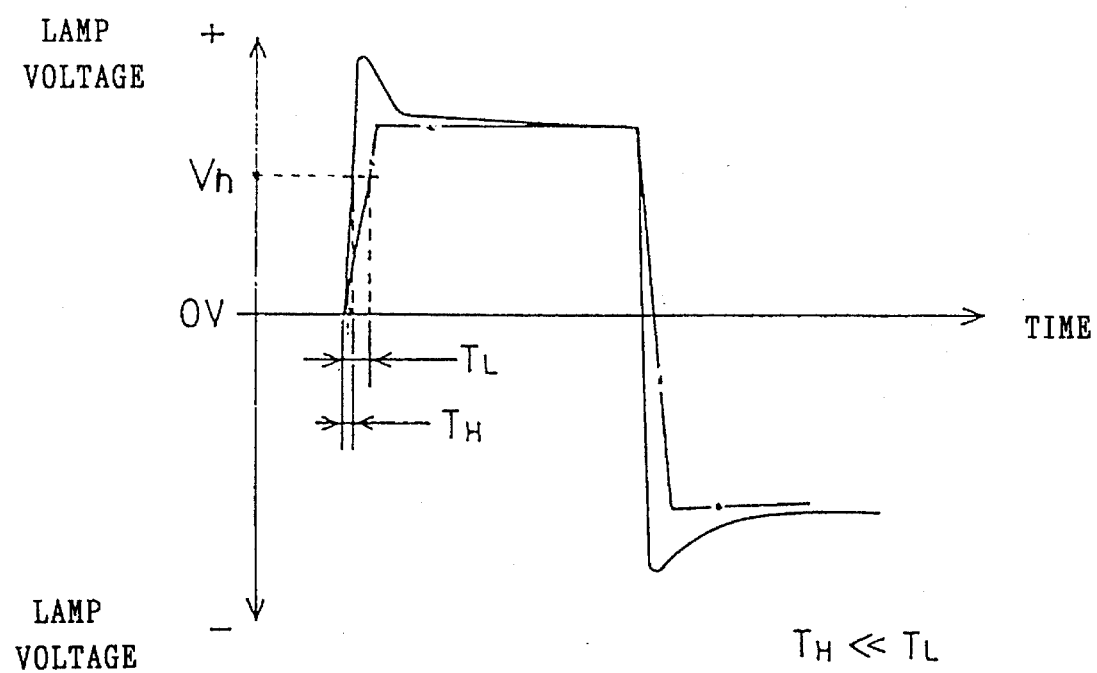
FIG. 32 is a graph showing a lamp voltage applied to the lamp.

By the way, the potential of the battery 12 is extremely decreased (4 to 6 volts) by a starter motor (not shown). The lamp voltage applied to the lamp 15 when the potential is decreased is shown by the alternate long and short dash line in FIG. 32. When the potential of the battery 12 is not low, a lamp voltage is applied which is abrupt in rise and fall as shown by the solid line in FIG. 32.

If the potential of the battery 12 is not decreased, the time TH required for the lamp voltage to reach a discharge maintaining voltage Vh is short. However, if the potential of the battery 12 is decreased, the time TL required for the lamp voltage to reach a discharge maintaining voltage Vh is long. Therefore, owing to the switching transient phenomena of the transistors Q1 to Q4, the lamp current is broken for a long time and further the lamp 15 is easily extinguished.

To avoid this fault, the low-voltage detecting circuit 72 shown in FIG. 31 causes the analogue switch 57 to be turned off when the circuit 72 detects the fall of the voltage mentioned above. Thereby, the flip flop 58 stops its operation. Accordingly, one of the output levels of the terminals F1 and F2 of the flip flop 58 becomes H-level, and the other output level becomes L-level.

Therefore, a state is fixed in which the transistors Q1, Q4 are turned on while the transistors Q2, Q3 are turned off or in contrast, the transistors Q1, Q4 are turned off while the transistors Q2, Q3 are turned on. In other words, without the change of the direction of the current running through the lamp 15, the DC current continuously runs through the lamp 15. Since there is no break of the lamp current, the lamp 15 is hardly extinguished.

Figure 33:
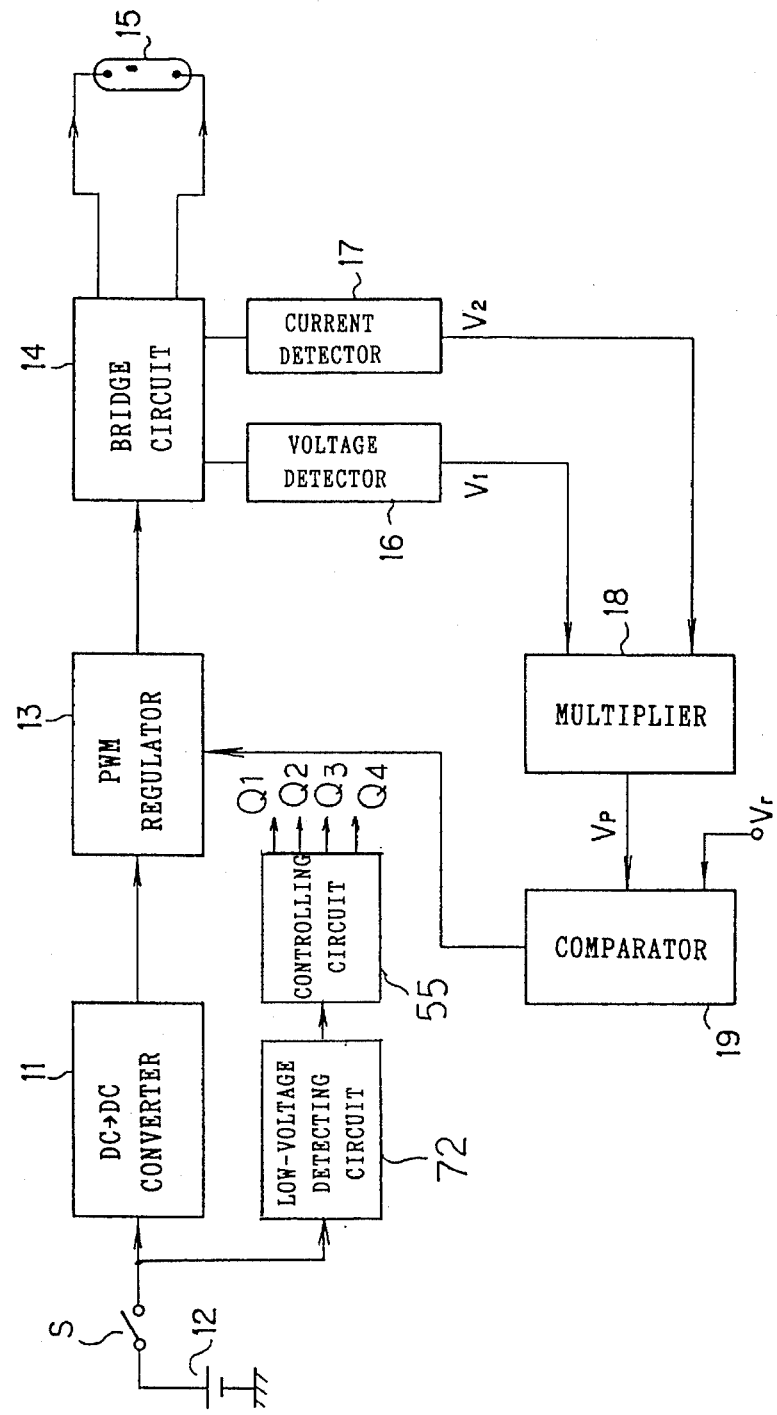
FIG. 33 is a block diagram showing a construction of a discharge lamp lighting apparatus according to an eleventh embodiment of the invention.
Figure 34:
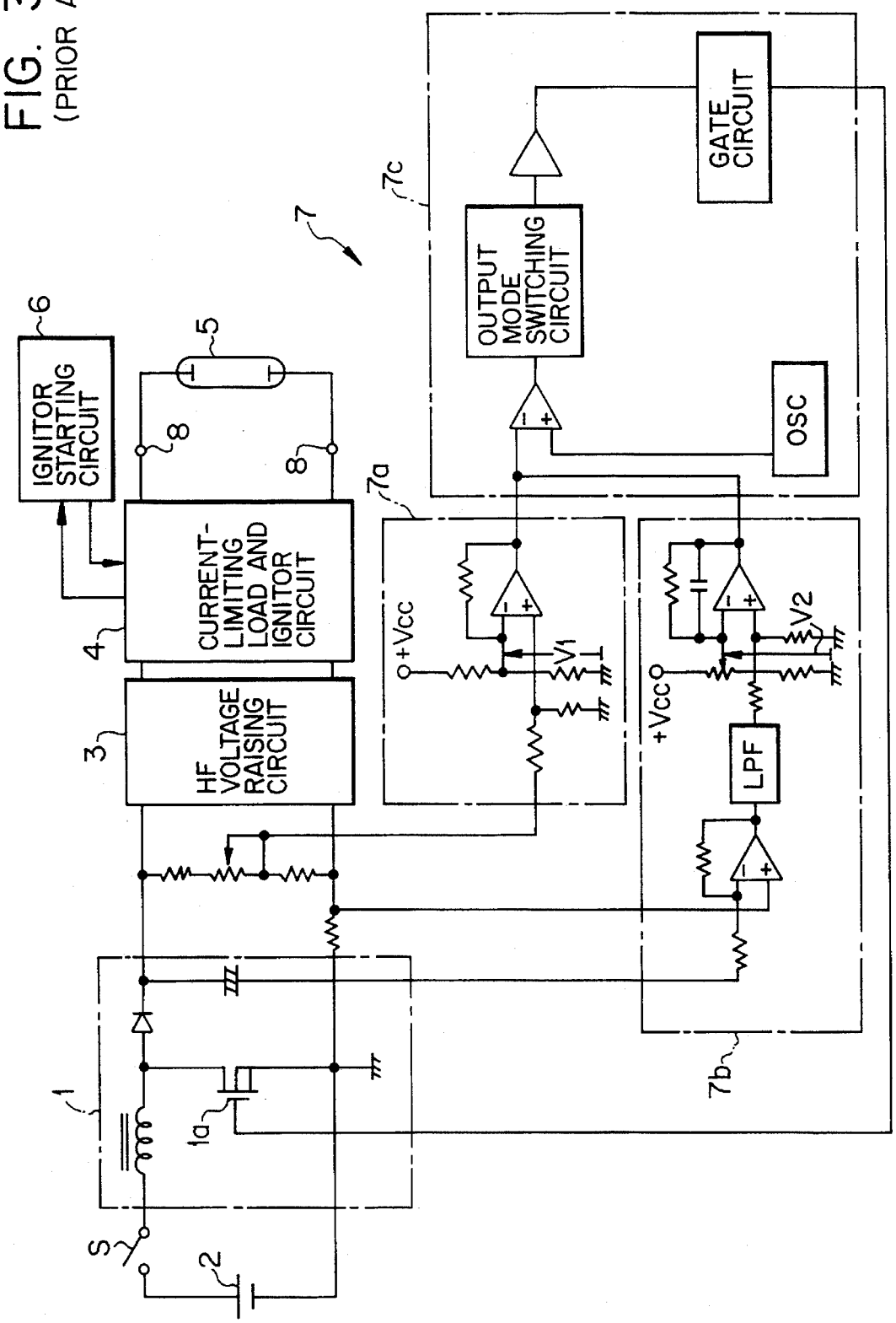
FIG. 34 is a circuit diagram showing a construction of a conventional discharge lamp lighting apparatus.

FIG. 33 is a block diagram showing a discharge lamp lighting apparatus in which the apparatus shown in FIG. 1 is provided with the controlling circuit 55 and the low-voltage detecting circuit 72 each mentioned above.

What is claimed is:

1. In a discharge lamp lighting apparatus comprising voltage raising means for raising a DC input voltage, pulse generating means for varying an output voltage output by said voltage raising means to a pulse voltage having a given pulse width and outputting said pulse voltage, and a bridge circuit for applying said pulse voltage to a discharge lamp, said discharge lamp lighting apparatus further comprising:

voltage detecting means for detecting a voltage applied to said discharge lamp;

current detecting means for detecting a current running through said discharge lamp;

first amplifying means for amplifying a voltage detection signal detected by said voltage detecting means;

second amplifying means for amplifying a current detection signal detected by said current detecting means;

first delaying means, connected in parallel to said first amplifying means, for delaying an output of said first amplifying means in order to increase electric power fed to said discharge lamp in initial lighting of said discharge lamp, said first delaying means comprising a resistance and a Zener diode;

second delaying means, connected in parallel to said second amplifying means, for delaying an output for said second amplifying means in order to increase electric power fed to said discharge lamp in initial lighting of said discharge lamp, said second delaying means comprising a resistance and a Zener diode;

adding means for adding a first amplification signal output by said first amplifying means and a second amplification signal output by said second amplifying means; and pulse width modulating means for controlling the pulse width of said pulse voltage so that an addition signal output by said adding means becomes a predetermined value.

2. In a discharge lamp lighting apparatus comprising voltage raising means for raising a DC input voltage, pulse generating means for varying an output voltage output by said voltage raising means to a pulse voltage having a given pulse width and outputting said pulse voltage, and a bridge circuit for applying said pulse voltage to a discharge lamp, said discharge lamp lighting apparatus further comprising:

voltage detecting means for detecting a voltage applied to said discharge lamp;

current detecting means for detecting a current running through said discharge lamp;

first amplifying means for amplifying a voltage detection signal detected by said voltage detecting means;

second amplifying means for amplifying a current detection signal detected by said current detecting means;

first delaying means, connected in parallel to said first amplifying means, for delaying an output of said first amplifying means in order to increase electric power fed to said discharge lamp in initial lighting of said discharge lamp, said first delaying means comprising a DC circuit of a resistance and an analogue switch;

second delaying means, connected in parallel to said second amplifying means, for delaying an output of said second amplifying means in order to increase electric power fed to said discharge lamp in initial lighting of said discharge lamp, said second delaying means comprising a DC circuit of a resistance and an analogue switch;

adding means for adding a first amplification signal output by said first amplifying means and a second amplification signal output by said second amplifying means; and pulse width modulating means for controlling the pulse width of said pulse voltage so that an addition signal output by said adding means becomes a predetermined value;

the analogue switch of said first delaying means being turned on when the voltage detected by said voltage detecting means is more than a given voltage, the analogue switch of said second delaying means being turned on when the voltage detected by said voltage detecting means is less than a given voltage.

3. In a discharge lamp lighting apparatus comprising voltage raising means for raising a DC input voltage, pulse generating means for varying an output voltage output by said voltage raising means to a pulse voltage having a given pulse width and outputting said pulse voltage, and a bridge circuit for applying said pulse voltage to a discharge lamp, said discharge lamp lighting apparatus further comprising:

voltage detecting means for detecting a voltage applied to said discharge lamp;

current detecting means for detecting a current running through said discharge lamp;

first attenuating means for attenuating an output of a voltage detection signal detected by said voltage detecting means in such a way as to enlarge an attenuation degree according to the increase of a voltage of said voltage detection signal, in order to increase electric power fed to said discharge lamp in initial lighting of said discharge lamp, said first attenuating means comprising a plurality of comparators;

second attenuating means for attenuating a current detection signal detected by said current detecting means in such a way as to enlarge an attenuation degree according to the increase of a voltage of said current detection signal, in order to increase electric power fed to said discharge lamp in initial lighting of said discharge lamp, said second attenuating means comprising a plurality of comparators;

adding means for adding a voltage attenuation signal output by said first attenuating means and a current attenuation signal output by said second attenuating means;

comparing means for comparing the value of an addition signal output by said adding means with a predetermined reference value and outputting a resultant comparison signal; and pulse width modulating means for controlling the pulse width of said pulse voltage so that said comparison signal becomes zero.

4. In a discharge lamp lighting apparatus comprising voltage raising means for raising a DC input voltage, pulse generating means for varying an output voltage output by said voltage raising means to a pulse voltage having a given pulse width and outputting said pulse voltage, a bridge circuit for applying said pulse voltage to a discharge lamp, voltage detecting means for detecting a voltage applied to said discharge lamp, current detecting means for detecting a current running through said discharge lamp, first amplifying means for amplifying a voltage detection signal detected by said voltage detecting means, second amplifying means for amplifying a current detection signal detected by said current detecting means, adding means for adding a first amplification signal output by said first amplifying means and a second amplification signal output by said second amplifying means, and pulse width modulating means for controlling a pulse width of said pulse voltage so that an addition signal output by said adding means becomes a predetermined value, said discharge lamp lighting apparatus further comprising:

first delaying means, connected in parallel to said first amplifying means, for delaying an output of said first amplifying means in order to increase electric power fed to said discharge lamp in initial lighting of said discharge lamp, said first delaying means comprising a resistance and a Zener diode; and second delaying means, connected in parallel to said second amplifying means, for delaying an output of said second amplifying means in order to increase electric power fed to said discharge lamp in initial lighting of said discharge lamp, said second delaying means comprising a resistance and a Zener diode.

5. In a discharge lamp lighting apparatus comprising voltage raising means for raising a DC input voltage, pulse generating means for varying an output voltage output by said voltage raising means to a pulse voltage having a given pulse width and outputting said pulse voltage, a bridge circuit for applying said pulse voltage to a discharge lamp, voltage detecting means for detecting a voltage applied to said discharge lamp, current detecting means for detecting a current running through said discharge lamp, first amplifying means for amplifying a voltage detection signal detected by said voltage detecting means, second amplifying means for amplifying a current detection signal detected by said current detecting means, adding means for adding a first amplification signal output by said first amplifying means and a second amplification signal output by said second amplifying means, and pulse width modulating means for controlling a pulse width of said pulse voltage so that an addition signal output by said adding means becomes a predetermined value, said discharge lamp lighting apparatus further comprising:

first delaying means, connected in parallel to said first amplifying means, for delaying an output of said first amplifying means in order to increase electric power fed to said discharge lamp in initial lighting of said discharge lamp, said first delaying means comprising a DC circuit of a resistance and an analogue switch; and second delaying means, connected in parallel to said second amplifying means, for delaying an output of said second amplifying means in order to increase electric power fed to said discharge lamp in initial lighting of said discharge lamp, said second delaying means comprising a DC circuit of a resistance and an analogue switch;

the analogue switch of said first delaying means being turned on when the voltage detected by said voltage detecting means is more than a given voltage, the analogue switch of said second delaying means being turned on when the voltage detected by said voltage detecting means is less than a given voltage.

6. In a discharge lamp lighting apparatus comprising voltage raising means for raising a DC input voltage, pulse generating means for varying an output voltage output by said voltage raising means to a pulse voltage having a given pulse width and outputting said pulse voltage, a bridge circuit for applying said pulse voltage to a discharge lamp, voltage detecting means for detecting a voltage applied to said discharge lamp, current detecting means for detecting a current running through said discharge lamp, comparing means for outputting a comparison signal, and pulse width modulating means for controlling a pulse width of said pulse voltage so that said comparison signal becomes zero, said discharge lamp lighting apparatus further comprising:

first attenuating means for attenuating an output of a voltage detection signal detected by said voltage detecting means in such a way as to enlarge an attenuation degree according to an increase of a voltage of said voltage detection signal, in order to increase electric power fed to said discharge lamp in initial lighting of said discharge lamp, said first attenuating means comprising a plurality of comparators;

second attenuating means for attenuating an output of a current detection signal detected by said current detecting means in such a way as to enlarge an attenuation degree according to an increase of a voltage of said current detection signal, in order to increase electric power fed to said discharge lamp in initial lighting of said discharge lamp, said second attenuating means comprising a plurality of comparators; and adding means for adding a voltage attenuation signal output by said first attenuating means and a current attenuation signal output by said second attenuating means and outputting an addition signal to said comparing means;

said comparing means comparing a value of said addition signal with a predetermined reference value and outputting a resultant comparison signal.

* * * * *